US008873744B2

(12) United States Patent
Inami et al.

(10) Patent No.: US 8,873,744 B2
(45) Date of Patent: Oct. 28, 2014

(54) ELECTRONIC DOCUMENT PROCESSING SYSTEM

(75) Inventors: Yasuharu Inami, Kahoku (JP); Mutsumu Nagashima, Kahoku (JP); Kensuke Kuraki, Kawasaki (JP); Taizo Anan, Kawasaki (JP)

(73) Assignees: PFU Limited, Ishikawa (JP); Fujitsu Limited, Kawasaki (JP)

( * ) Notice: Subject to any disclaimer, the term of this patent is extended or adjusted under 35 U.S.C. 154(b) by 387 days.

(21) Appl. No.: 12/899,126

(22) Filed: Oct. 6, 2010

(65) Prior Publication Data

US 2011/0019816 A1 Jan. 27, 2011

Related U.S. Application Data

(63) Continuation of application No. PCT/JP2008/059910, filed on May 29, 2008.

(51) Int. Cl.
*G06F 21/00* (2013.01)
*G06F 21/60* (2013.01)
(Continued)

(52) U.S. Cl.
CPC ............... *G09C 5/00* (2013.01); *G06F 21/608* (2013.01); *G06F 21/6209* (2013.01); *G06F 2221/2149* (2013.01); *H04L 2209/608* (2013.01); *H04L 9/08* (2013.01); *H04N 1/32203* (2013.01); *H04L 2209/30* (2013.01); *G06F 2221/2107* (2013.01); *G06T 1/00* (2013.01); *H04N 1/32208* (2013.01); *H04N 2201/3281* (2013.01); *H04N 1/4486* (2013.01)
USPC ............. 380/28; 380/243; 380/212; 713/176; 705/78

(58) Field of Classification Search
CPC .......... G06F 2221/2107; G06F 21/608; G06F 21/6209; G06F 2221/2147; G09C 5/00; H04L 9/00; H04L 2209/30
USPC .......................................................... 380/28
See application file for complete search history.

(56) References Cited

U.S. PATENT DOCUMENTS 5,398,283 A * 3/1995 Virga ............................ 380/243
5,726,435 A 3/1998 Hara et al.
(Continued)

FOREIGN PATENT DOCUMENTS

JP 08-179689 A 7/1996
JP 2938338 B2 8/1999
(Continued)

OTHER PUBLICATIONS

Tseng, Yu-Chee, Yu-Yuan Chen, and Hsiang-Kuang Pan. "A Secure Data Hiding Scheme for Binary Images." IEEE Transactions on Communications, vol. 50, Issue: 8, Publication Year: 2002, pp. 1227-1231.*

(Continued)

*Primary Examiner* — Taghi Arani
*Assistant Examiner* — Narciso Victoria
(74) *Attorney, Agent, or Firm* — Westerman, Hattori, Daniels & Adrian, LLP

(57) ABSTRACT

An electronic document processing system 900 includes a digital image generating unit 15 generating a digital image in a predetermined range of the electronic document; an image encrypting unit 11 generating an encrypted image by converting at least a partial area of the generated digital image; a data encrypting unit 21 generating encrypted data by extracting data contained in the predetermined range in pieces of data organizing the electronic document and encrypting the data; an encrypted data storing unit 22 storing the encrypted data; and an encrypted electronic document generating unit 23 generating an encrypted electronic document by replacing the data contained in the predetermined range in the electronic document with the encrypted image.

12 Claims, 43 Drawing Sheets

(51) Int. Cl.
*G06F 21/62* (2013.01)
*H04L 9/08* (2006.01)
*H04N 1/32* (2006.01)
*G06T 1/00* (2006.01)
*G09C 5/00* (2006.01)
*H04N 1/44* (2006.01)

(56) References Cited

U.S. PATENT DOCUMENTS

| | | | | |
|---|---|---|---|---|
| 6,178,243 | B1* | 1/2001 | Pomerantz et al. | 380/243 |
| 6,839,844 | B1* | 1/2005 | Okano | 713/176 |
| 7,426,054 | B1 | 9/2008 | Saito | |
| 2002/0141648 | A1 | 10/2002 | Tanigawa | |
| 2004/0109565 | A1* | 6/2004 | Uehara et al. | 380/269 |
| 2004/0202326 | A1* | 10/2004 | Chen et al. | 380/263 |
| 2008/0317348 | A1 | 12/2008 | Saito | |
| 2009/0262931 | A1 | 10/2009 | Nakagata et al. | |

FOREIGN PATENT DOCUMENTS

| | | |
|---|---|---|
| JP | 2000-315998 A | 11/2000 |
| JP | 2000-332984 A | 11/2000 |
| JP | 2002-300408 A | 10/2002 |
| WO | 2008/053576 A1 | 5/2008 |

OTHER PUBLICATIONS

International Search Report of PCT/JP2008/059910, mailing date Aug. 5, 2008.

Notification of Transmittal of Translation of the International Preliminary Report on Patentability (Form PCT/IB/338) of International Application No. PCT/JP2008/059910 mailed Jan. 20, 2011 with Forms PCT/IB/373 and PCT/ISA/237.

* cited by examiner

*FIG. 5D*

┌─────────────────────────────────────────────────────┐
│ <FONT TYPE = GOTHIC, CHARACTER SIZE = 10,          │
│         CHARACTER COLOR = BLACK,                    │
│ DISPLAY COORDINATES = ##> firmware </>             │
└─────────────────────────────────────────────────────┘
                         │ EXTRACTION
                         ▼
                    ┌─────────┐
                    │   mwa   │
                    └─────────┘
                         │ DATA ENCRYPTION
                         ▼
                  ┌───────────┐
                  │ 0x******  │
                  └───────────┘

*FIG. 5E*

```
<FONT TYPE = GOTHIC, CHARACTER SIZE = 10,
       CHARACTER COLOR = BLACK,
DISPLAY COORDINATES = ##> fir <ENCRYPTED IMAGE> re </>
       <ENCRYPTED DATA = 0x******>
```

FIG. 6B
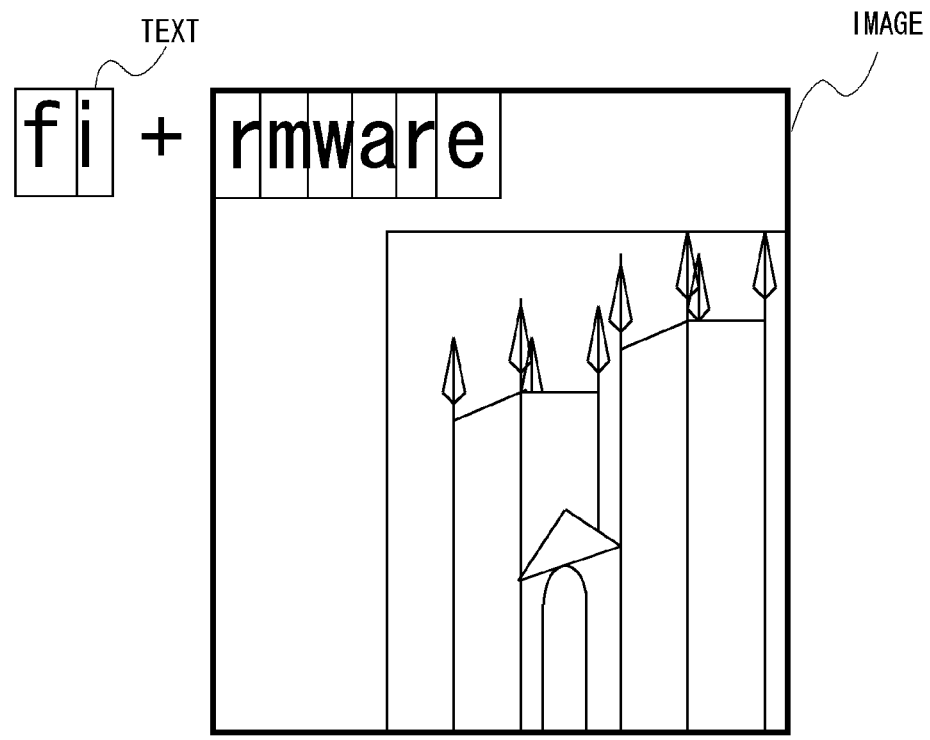
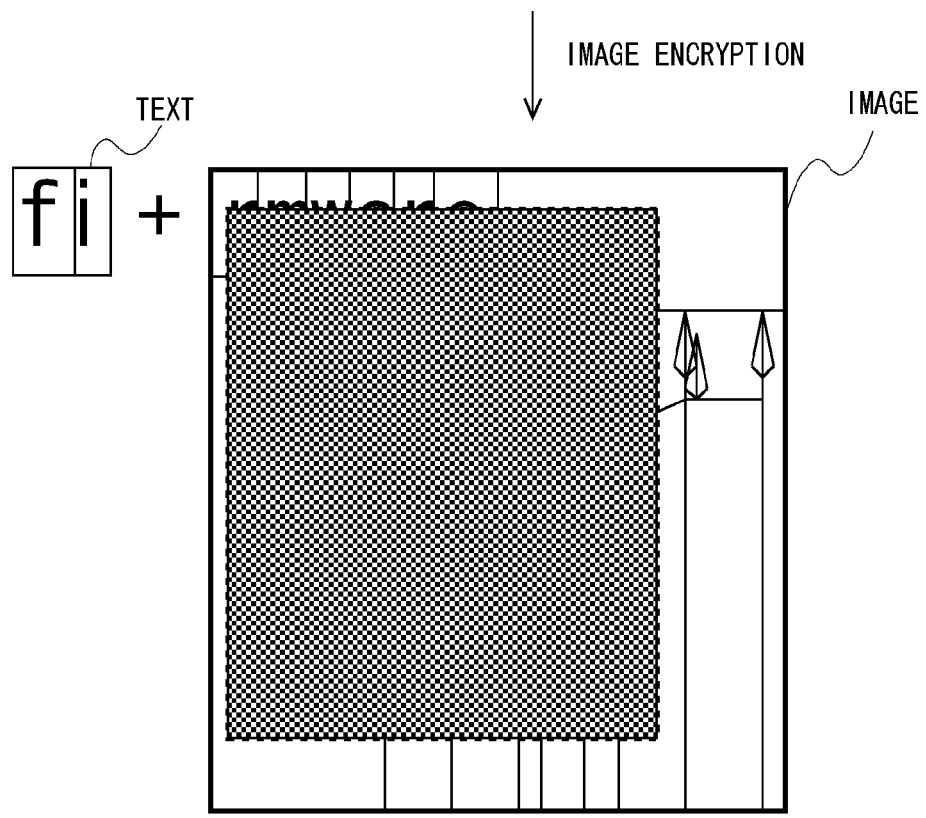

(A)

(B)

FIG. 22
(A)　　　(B)　　　(C)　　　(D)
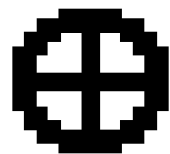 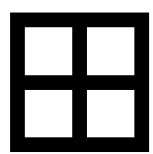 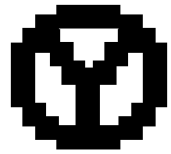 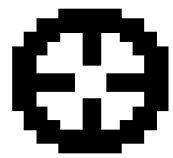

ELECTRONIC DOCUMENT PROCESSING SYSTEM

This is a continuation of Application PCT/JP2008/059910, filed on May 29, 2008, now pending, the contents of which are herein wholly incorporated by reference.

FIELD

The present invention relates to a technology for encrypting an electronic document.

BACKGROUND

A technology of dealing with encryption of a printed matter is exemplified by a technology of, at first, segmenting a whole image into a plurality of blocks, rearranging images of the segmented blocks based on parameters obtained from an inputted password (encryption key), further black-and-white-inverting and mirror-inverting the images of the blocks designated by the parameters, and thus encrypting the images (refer to Japanese Patent Laid-Open Publication No. H08-179689). On the occasion of decrypting the encrypted image, a positioning frame is attached to the outside of the image, and, after inputting the password (decryption key), the encrypted image is decrypted into the original image through procedures reversed to those for the encryption.

Another technology is that black-and-white squares having a predetermined size, which represent binary data, are arrayed in matrix and embedded into the printed matter (refer to Japanese Patent Publication No. 2938338). Further, for recognizing visualized positions on the occasion of decryption, positioning symbols are attached to predetermined positions of the matrix on the printed matter. Based on these positioning symbols, the image is captured by a scanner and a camera, and the embedded information is decrypted.

SUMMARY

A conventional technology for preventing a leakage of information is exemplified by a technology enabling an authorized user (who knows a decryption password) to browse only a plaintext by encrypting the whole electronic document as binary data. This type of technology is, however, incapable of printing the important element in a concealed status on the paper medium etc and getting the information browsed. A technology flexible to the problem such as this has hitherto involved using a technique of setting the important element of the electronic document in a black-daubed state and then commercialized. In this type of technology, however, the data of the daubed area is completely deleted for preventing the information from being leaked out, and, the daub process is once done, the original data can not be restored of the daubed data. Therefore, a case of managing the documents on a database etc entails dually managing the data with the important element being daubed and the data (original data) with the important element not being daubed.

It is an object of the present invention, in view of the problems described above, providing an electronic document encrypting technology capable of printing an important element of an electronic document in a concealed status on a paper medium etc and getting the document browsed, and also performing integrated management of the data.

The present invention adopts the following means in order to solve the problems given above. Namely, the present invention is an electronic document processing system including: digital image generating means generating a digital image defined as an aggregation of pixels in a predetermined range of an electronic document; image encrypting means generating an encrypted image by converting at least a partial area of the digital image generated by the digital image generating means in a way that uses key information; data encrypting means generating encrypted data by extracting data contained in the predetermined range in pieces of data organizing the electronic document and encrypting the extracted data by use of the key information; encrypted data storing means storing the encrypted data; and encrypted electronic document generating means generating an encrypted electronic document by replacing the data contained in the predetermined range in the electronic document with the encrypted image.

Herein, the term "electronic document" connotes data containing some category of information such as a document (text), a graph and an illustration. The electronic document is generated by, e.g., a document creating application, a spreadsheet application, an illustration creating application, etc. The digital image generating means generates a digital image (e.g., bitmap data) defined as the aggregation of pixels on the basis of the image when displaying or printing the electronic document.

Herein, the predetermined range contains at least a want-to-encrypt portion as an image (which will hereinafter be referred to as [image encryption]), i.e., the portion having a want-to-conceal-content when the electronic document is display-output or print-output. According to the present invention, the predetermined range such as this is transformed into a digital image, thereby enabling the information based on the image encryption to be browsed with restriction. The image encryption does not entail encrypting the whole of the digital image but may involve encrypting at least a partial area having the content of which the browsing is desired to be restricted. It should be noted that the image encryption implies, with respect to the image, that a person who browses the image is disabled from easily discerning what the pre-processing image is by executing image processing including a process of segmenting at least the image and rearranging (scrambling) the segmented image on the basis of the key information.

When the encrypted image containing the area of which the browsing is desired to be restricted is generated, the encrypted electronic document generating means replaces the data with the encrypted image. This scheme restricts a person having none of browsing authority to browse the important information but permits a person having the browsing authority to browse the information by decrypting the original digital image by use of a decryption key. The electronic document processing system according to the present invention enables, because of the encrypted information being the image, the encrypted information to be browsed in a way that displays the information on a display etc and prints the information on a paper medium in a status where only the important information is encrypted, and further can restore (decrypt) the encrypted portion into the original status as the necessity may arise.

This technology has no necessity for the dual management of the electronic document subjected to the black-daub process etc and the original electronic document, and enables the integrated management of the data to be performed. Further, even in the case of printing the information on the paper medium etc, the decryption from the image captured by using a scanner etc into the original image can be attained. If the want-to-conceal range is imaged and thus encrypted, however, the respective elements (a text, a layout, etc) contained in the electronic document are imaged batchwise, and hence, though capable of browsing the document by executing the decryption, it is difficult to edit (such as changing the text, the layout, etc) the document in a status quo.

Therefore, according to the present invention, the want-to-conceal information is further encrypted. Herein, in the present invention, the term "data encryption" connotes that pieces of information (data) organizing the electronic document are processed based on the key information, and indicates that the pre-processing information is made difficult to be easily acquired. When the encrypted data is generated, the encrypted data storing means stores the encrypted data. With this operation being thus done, it is feasible to restrict the person having none of the authority to acquire the important information and to decrypt the easily-editable electronic document with respect to the encrypted portion by restoring the pre-encrypting data from the encrypted data by use of the proper key information if necessary.

Namely, according to the present invention, while display-outputting or print-outputting the encrypted image, the editable electronic document can be generated by restoring the pre-encrypting complete electronic document if necessary. Moreover, the encrypted electronic document generated by the electronic document processing system according to the present invention contains the encrypted image, and hence, with respect to a copy with lost information as the electronic document through the print-output etc, the important information can be browsed by decrypting the image with the proper key information in such a way that the information is imaged by a scanner etc, then the image is captured by a device capable of decrypting the image and decrypted by use of the proper key information, whereby the important information can be browsed. Moreover, the electronic document processing system according to the present invention can restore the pre-encrypting electronic document and also restore the information from the printed paper medium etc, thereby eliminating the necessity for an operation of selecting a technique utilized for the encryption depending on the application and enabling the user to create the encrypted electronic document with less of operations without being aware of handling the post-encrypting electronic document.

The data as a data encrypting target is, however, unlike the digital image as the aggregation of pixels, an aggregation of information elements delimited on a predetermined unit. Therefore, unlike the image encryption of the digital image in which an encryption range can be minutely designated on a pixel-unit basis, the data encryption has difficulty of encrypting only an arbitrary range as the case may be. For example, one character, which is a minimum unit (element) of a character string and defined by a character code, has the difficulty that a part of the single character is data-encrypted by segmenting the character further minutely and that only a partial area of one image is data-encrypted by use of binary data cryptography.

Accordingly, the electronic document processing system according to the present invention may further include: input accepting means accepting an input of an image encrypting target area becoming an image encrypting target that is designated in an image into which the electronic document is rendered and output; and an imaging target range specifying means specifying, as the predetermined range becoming the imaging target of the digital image generating means, a range including all of elements that at least some portions of a rendered image of the elements are embraced by the image encrypting target area in the render-output image, in the respective elements of the data within the electronic document, on the basis of the image encrypting target area accepted by the input accepting means.

Herein, the elements of the data in the electronic document are employed without being further segmented as the elements forming a rendering image on the occasion of rendering the electronic document and correspond to, e.g., characters, images etc contained in the electronic document. On the occasion of designating the image encrypting target area, the image encrypting target area can be designated on the pixel-unit basis and might be designated in a way that divides a certain element as the case may be. In this case, in the image encryption, the designated image encrypting target area is accurately encrypted, and, with respect to the elements of which only a part is contained in the area, an image of only the partial area contained in the area may be encrypted. In the case of grasping the electronic document as the aggregation of data forming the elements, however, it is difficult to segment the data forming one element according to the designation of the pixel unit of the image encrypting target area.

The present invention enables the important information to be accurately data-encrypted even in the case of designating the area designating information dividing the element(s) by specifying, as a predetermined range as an imaging target range by the digital image generating means, a range, of the image of the electronic document that is output for rendering, including all of such elements that at least a part of the rendering image of the elements is included in the image encrypting target area.

Further, the present invention is an electronic document processing system processing an electronic document, data of a predetermined range of which is replaced with an encrypted image generated by converting at least a part of a digital image generated with respect to the predetermined range, the system including: encrypted data acquiring means acquiring encrypted data generated by encrypting the data in the predetermined range; data decrypting means generating decrypted data by decrypting the encrypted data acquired by the encrypted data acquiring means in a way that uses key information; and decrypted electronic document generating means generating decrypted electronic document by replacing the encrypted image included in the electronic document with the decrypted data.

According to the present invention, in the electronic document of which the browsing of the important information is restricted by displaying the encrypted image when browsing, instead of decrypting the encrypted image, the encrypted data generated by decrypting the data of the range corresponding to the encrypted image is acquired and then decrypted. The encrypted image is replaced with the thus-generated encrypted data, whereby the present invention makes it possible to restore the electronic document before being transformed into the digital image if necessary and to edit the document in the electronic document of which the browsing is restricted based on the encrypted image.

It should be noted that in the electronic document processing system according to the present invention, the editable electronic document can be decrypted by decrypting the stored encrypted data, however, in the case of aiming at only browsing the electronic document, the decrypted digital image decrypted from the encrypted image may be output.

Namely, the electronic document processing system according to the present invention may further include: encrypted image acquiring means acquiring the encrypted image from the electronic document; image decrypting means generating a decrypted digital image by decrypting the encrypted image acquired by the encrypted image acquiring means by use of the key information; and decrypted digital image output means outputting a digital image decrypted by the image decrypting means in place of the encrypted image when the electronic document including the encrypted image is output for a browsing purpose.

Furthermore, the encrypted data acquiring means may store the encrypted data by adding the encrypted data to a header area, a footer area, a comment area or an extended area of the electronic document and may also acquire the encrypted data from the header area, the footer area, the comment area or the extended area of the electronic document. It is preferable that the encrypted data is stored by a method that can be easily obtained on the occasion of decrypting the encrypted electronic document. The encrypted data is added to the electronic document itself, whereby the encrypted data associated therewith can be easily acquired on the occasion of decrypting the encrypted electronic document.

Note that the encrypted data is generated with respect to a plurality of areas within the electronic document, in which case the encrypted data storing means, it is preferable, stores the encrypted data in the way of being associated with the image encrypting target area or the imaging target range. The association can involve adopting a method of attaching pieces of identifying information to the image encrypting target area or the imaging target range and to the encrypted data, a method of attaching positional information of the image encrypting target area or the imaging target range to the encrypted data, and so on.

Still further, the encrypted data storing means may add the encrypted data by way of steganography, a digital watermark or meta-information of the image to the encrypted image, and the encrypted data acquiring means may acquire the encrypted data by way of steganography, a digital watermark or meta-information embedded in the image to the encrypted image. With this scheme, in the case of generating the encrypted data with respect to the plurality of areas within the single electronic document, there is no necessity for making the association using the identifying information and the positional information, and it is feasible to specify the encrypted data corresponding to the image encrypting target area or the imaging target range.

Note that the encrypted data storing means may store the encrypted data in a server device etc connected via a network etc, and the encrypted data acquiring means may acquire the encrypted data from this server device. In this case also, the identifying information and the positional information are required to be associated with each other. Moreover, in the case of storing the encrypted data in the server device, an access right to the server device is controlled on a user-by-user basis, whereby the control of whether the restoration of the editable electronic document is permitted based on the access right or not can be done.

Herein, the image encrypting means converts the image of the encrypting target area into a processed image by use of the key information and regularly converts the pixel values of the processed image to thereby generate the encrypted image having the regularity that is used for specifying the encrypting position on the occasion of the decryption, and the image decrypting means detects the encrypting position where the pixel values are regularly converted in the encrypted image, and decrypts the encrypted image into the digital image on the basis of the encrypting position and the key information. The pixel values are regularly converted when in the encrypting process, thereby enabling the encrypting position to be detected based on this regularity and the high-accuracy decryption to be performed.

Further, the present invention can be grasped by way of a method executed by the computer or as a program for making the computer function as the respective means. Yet further, the present invention may also be a recording medium recorded with such a program that can be read by the computer and other devices, machines, etc. Herein, the term "recording medium readable by the computer etc" connotes a recording medium capable of storing information such as data and programs electrically, magnetically, optically, mechanically or by chemical action, which can be read from the computer.

The present invention provides the electronic document processing technology capable of browsing the important portion of the electronic document in the status of concealing the important portion by its being printed on the paper medium etc, conducting the integrated management of the data and further easily editing the data after the decryption.

BRIEF DESCRIPTION OF THE DRAWINGS

FIG. 5D is a flowchart illustrating a flow of decrypting the data in the embodiment.

FIG. 5E is a diagram illustrating contents of an encrypted electronic document generated in the embodiment.

FIG. 6B is a diagram B illustrating a flow of selecting the image encrypting target area and finally generating the encrypted electronic document.

FIG. 22(A)-(D) are diagrams showing an example of a positioning marker used for the encrypting process.

DESCRIPTION OF EMBODIMENTS

Embodiments of the present invention will be described with reference to the drawings. It should be noted that the embodiment exemplifies a system according to the present invention as an electronic document processing system including both of an encrypting function and a decrypting function, however, the electronic document processing system according to the present invention may be carried out as an encryption system having the encrypting function or a decryption system having the decrypting function.

Figure 1:
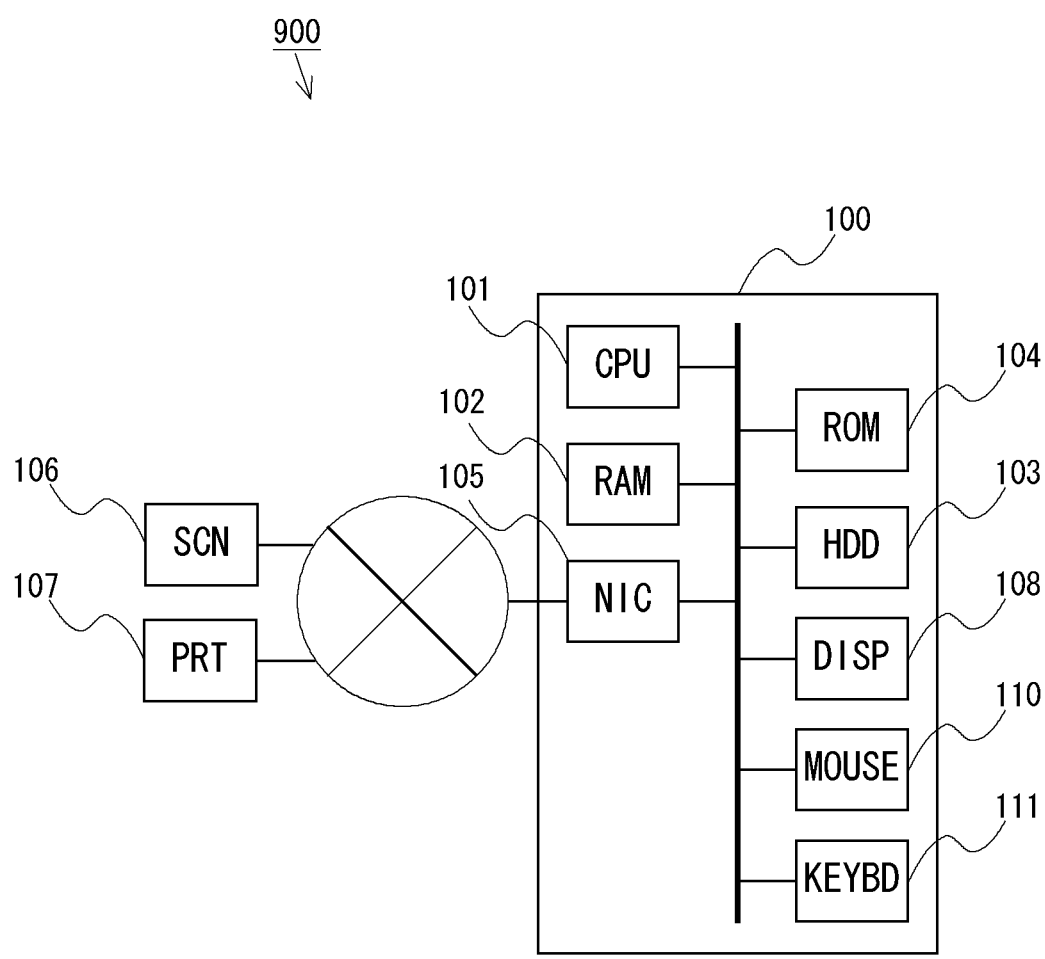
FIG. 1 is a diagram illustrating an outline of a hardware architecture of an electronic document processing system according to an embodiment.

FIG. 1 is a diagram showing an outline of a hardware architecture of an electronic document processing system according to the embodiment. An electronic document processing system 900 includes a computer 100, a scanner 106 and a printer 107, which are connected to the computer 100. Herein, the computer 100 is a computer including a CPU (Central Processing Unit) 101, a main storage device such as a RAM (Random Access Memory) 102, an auxiliary storage device such as a HDD (Hard Disk Drive) 103, a ROM (Read Only Memory) 104, a display device such as a display 108, an input device such as a mouse 110/keyboard 111 and a network interface 105, in which the scanner 106 and the printer 107 are connected via a network such as a LAN (Local Area Network) to the network interface 105. Note that in the example illustrated in FIG. 1, the scanner 106 and the printer 107 are connected via the network interface 105 and may also be connected via other interfaces such as a USB (Universal Serial Bus).

Figure 2:
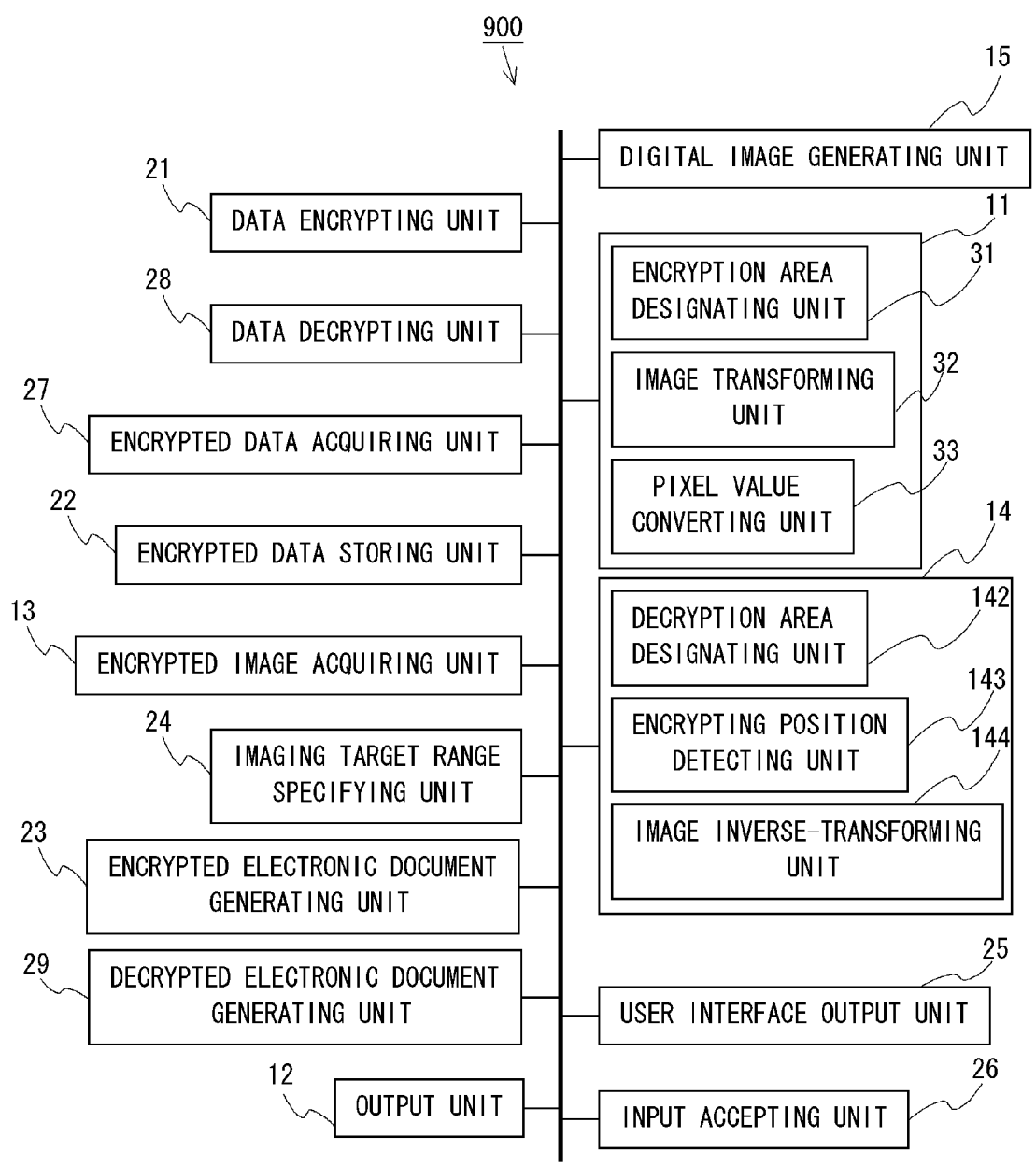
FIG. 2 is a diagram illustrating an outline of a functional configuration of the electronic document processing system according to the embodiment.

FIG. 2 is a diagram showing an outline of a functional configuration of the electronic document processing system 900 according to the embodiment. The CPU 101 executes an electronic document processing program read from the HDD 103 and developed on the RAM 102, thereby functioning as the electronic document processing system 900 including: a user interface output unit 25 used for a user to output, to the display 108 etc, an interface for giving an instruction to the system by use of the mouse 110, the keyboard 111, etc; an input accepting unit 26 which accepts an input of the user etc; an imaging target range specifying unit 24 which specifies an imaging target range based on an area designated by the user; a digital image generating unit 15 which generates a digital image of the imaging target range on the basis of rendering information; an image encrypting unit 11 which generates an encrypted image by encrypting at least a part of the generated digital image; a data encrypting unit 21 which extracts data of the imaging target range and encrypting the extracted data; an encrypted data storing unit 22; an encrypted electronic document generating unit 23; and an output unit 12 which outputs the generated encrypted document etc.

The CPU 101 executes the electronic document processing program read from the HDD 103 and developed on the RAM 102 in order to decrypt the encrypted image, whereby the computer system illustrated in FIG. 1 further functions as the electronic document processing system 900 including: an encrypted image acquiring unit 13 which acquires the encrypted image from the electronic document or a paper medium; an encrypted data acquiring unit 27 which acquires the encrypted data corresponding to the encrypted image; a data decrypting unit 28; a decrypted electronic document generating unit 29; and an image decrypting unit 14 which generates a decrypted digital image by decrypting at least a part of the acquired digital image. Note that the respective function units such as the input accepting unit 26, the user interface output unit 25 and the output unit 12 are also used in a decrypting process of the encrypted image.

The digital image generating unit 15 generates the digital image defined as an aggregation of pixels with respect to the imaging target range of the electronic document. More specifically, the digital image generating unit 15 generates the pixel-formatted digital image based on the rendering information. The term "rendering information" connotes information for designating characters, format information, a layout, etc for displaying the electronic document on the display or printing the electronic document on the paper medium. The digital image generating unit 15 converts an image, in the case of printing the electronic document related to the rendering information on the paper medium or displaying the electronic document on the display 108 etc, into a so-called bitmap-formatted digital image. The image of displaying or printing the electronic document is generated as the bitmap-formatted image, thereby enabling the image encrypting unit 11 to encrypt the image.

The image encrypting unit 11 includes: an encryption area designating unit 31 which designates an encrypting target partial area of the digital image generated by the digital image generating unit 15; an image converting unit 32 which converts an image of the designated partial area into a processing image based on an encryption key; and a pixel value converting unit 33 which generates a converted image having regularity that is used for specifying a position of the partial area on the occasion of the decryption by regularly converting pixel values of the converted processing image. An in-depth description of the encrypting process of the image encrypting unit 11 will be made later on. In the embodiment, the image of the encrypting target area in the digital image generated by the digital image generating unit 15 is converted into the processing image by use of key information, and the pixel values of the processing image are converted with the regularity, thereby generating the encrypted image containing the converted image having the regularity that is employed for specifying the encrypting position on the occasion of the decryption.

The data encrypting unit 21 extracts data included in the imaging target range in the pieces of data organizing the electronic document and encrypts the extracted data by use of the key information (a common key (symmetric key) serving as an encryption key and a decryption key in the embodiment), thus generating the encrypted data. A data cryptography may involve properly adopting a cryptography from generally-used binary data cryptographies. To be specific, the data can be encrypted according to methods such as AES (Advanced Encryption Standard) or DES (Data Encryption Standard). It is preferable that an optimal cryptography is properly adopted corresponding to the embodiment, and, on the occasion of selecting the cryptography to be adopted, it is preferable to take a level of security of the cipher and a processing load exerted on the encrypting process into consideration. Further, a cryptography using an asymmetric key may also be adopted depending on a mode of making use of the document.

The image decrypting unit 14 includes: a decryption area designating unit (encryption area detecting unit) 142 which designates a decrypting target area in the encrypted image acquired by the encrypted image acquiring unit 13; an encrypting position detecting unit 143 which detects the encrypting position where the pixel values are regularly converted in the designated decryption area; and an image inverse transforming unit 144 which decrypts the decryption area into the digital image on the basis of the detected encrypting position and the decryption key. A decrypting process of the image decrypting unit 14 will be described in detail later on. In the embodiment, the image decrypting unit 14 decrypts the encrypted image acquired by the encrypted image acquiring unit 13 by use of the key information, thereby generating the decrypted digital image. On this occasion, if unable to acquire the information for designating the decryption area such as decrypting the information of which the image is captured from, e.g., the paper medium, the image decrypting unit 14 detects the encrypting position where the pixel values are regularly converted in the encrypted image, and decrypts the encrypted image into the digital image on the basis of the encrypting position and the key information.

Figure 3:
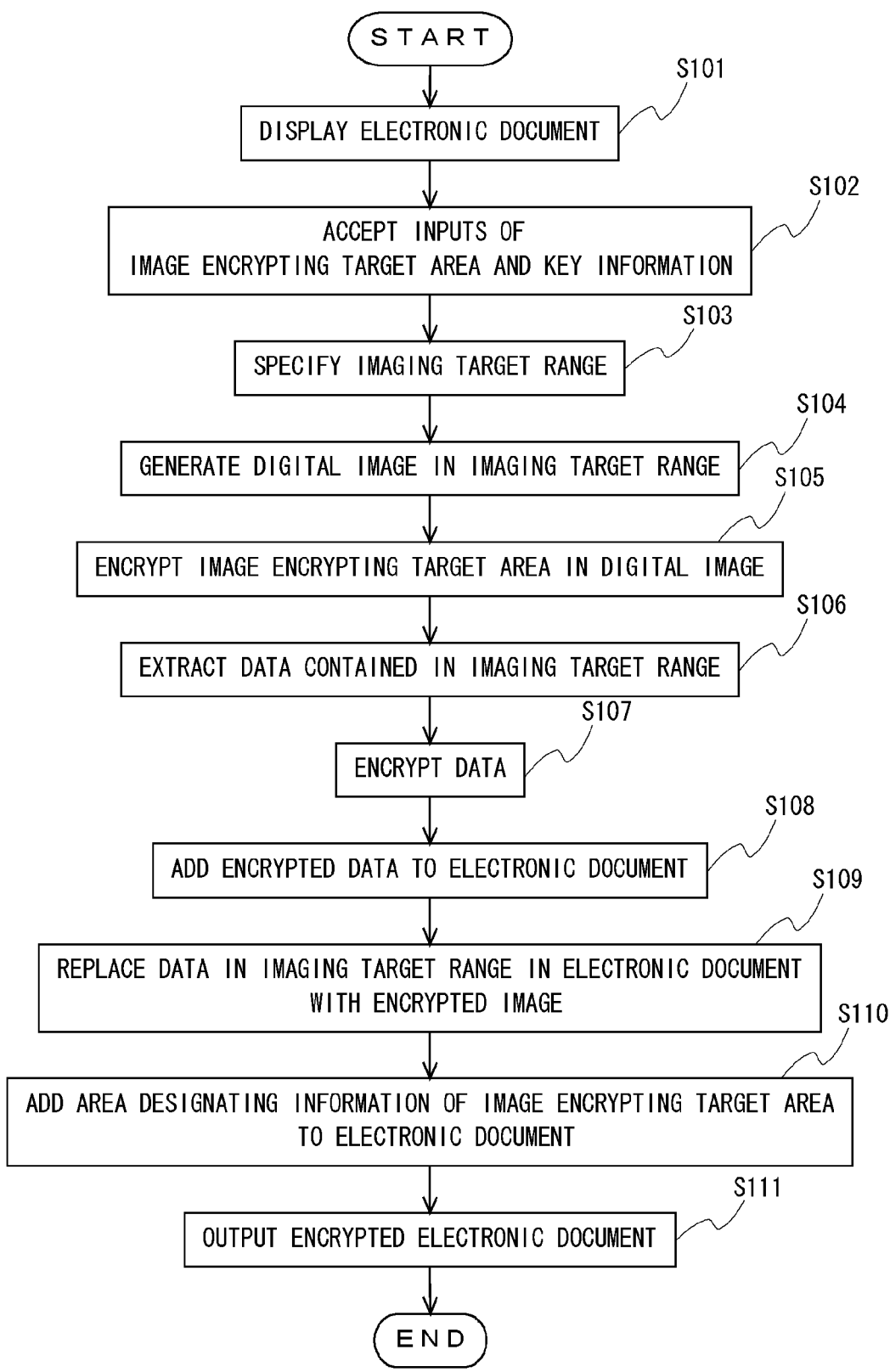
FIG. 3 is a flowchart illustrating a flow of an encrypting process in the embodiment.

FIG. 3 is a flowchart illustrating a flow of the encrypting process in the embodiment. A start of the process illustrated in the flowchart is triggered by an event that the user designates some type of electronic document created by using a document creating application, a spreadsheet application, etc as an encrypting target document.

In step S101 and step S102, the electronic document is displayed, and inputs of the image encrypting target area and the key information are accepted. The user interface output unit 25 reads the electronic document designated by the user from the HDD etc, then develops the electronic document on the RAM, and generates the rendering information by interpreting text information, graphs, illustrations and layout information contained in the document. Then, the user interface output unit 25, for prompting the user to select the image encrypting target area, generates a preview screen 600 based on the rendering information and displays the preview screen 600 on the display 108 (step S101).

Figure 4:
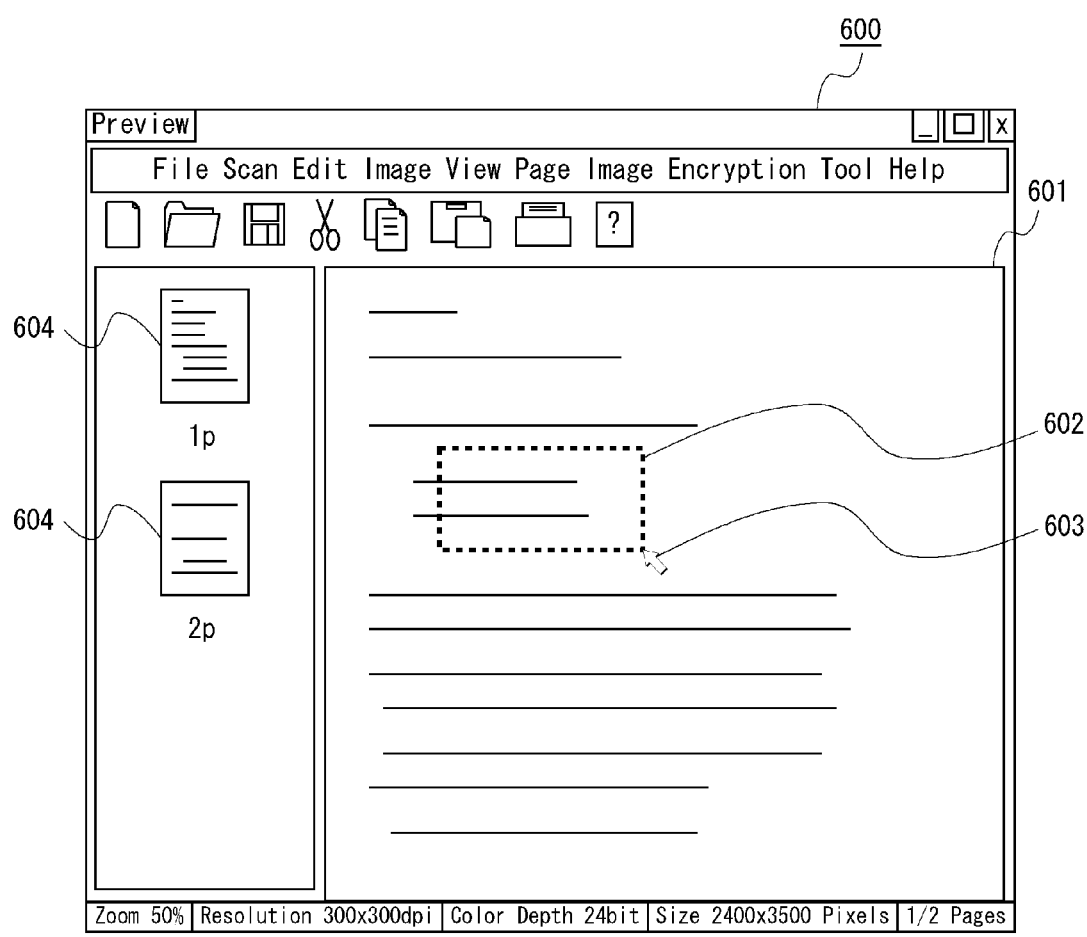
FIG. 4 is a diagram depicting a preview screen of the electronic document that is displayed for designating an area in the embodiment.

FIG. 4 is a diagram illustrating the preview screen 600 of the electronic document, which is displayed for designating the area, in the embodiment. An image 601 of the electronic document that is used for selecting the image encrypting target area is displayed on the preview screen 600, and the input accepting unit 26 accepts the designation of the image encrypting target area as the encrypting target area through a range designating operation using the input device such as the mouse 110 (step S102). In the embodiment, for example, a main button of the mouse 110 is kept pressing in a position where a left upper vertex of an encrypting target rectangular area 602 on the image 601 displayed on the display 108 is desired to be formed, then a pointer 603 on the display 108 is dragged by manipulating the mouse to a position where a right lower vertex of the rectangular area 602 is desired to be formed, and the main button is released, thus enabling the encrypting target area to be designated. The selection of the area, which is desired to be set as the encrypting target area, may involve using other methods.

Figure 5A:
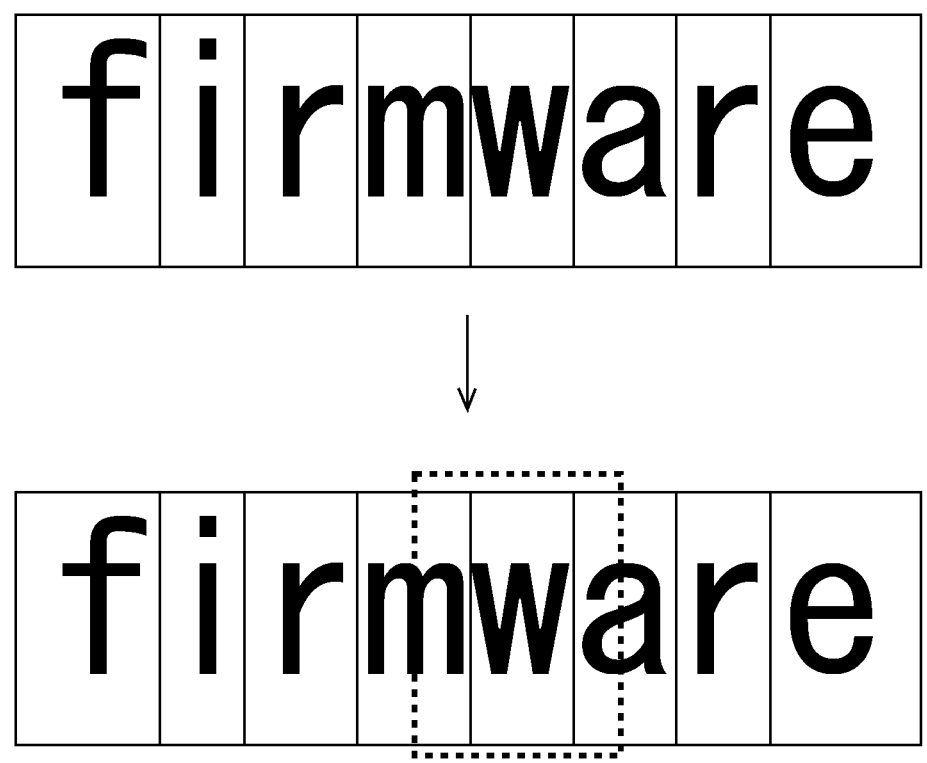
FIG. 5A is a diagram illustrating how an image encrypting target area is selected in the embodiment.

Further, in the embodiment, a part of elements displayed on the preview screen can be contained in the image encrypting target area. FIG. 5A is a diagram illustrating how the image encrypting target area is selected in the embodiment. In the example depicted in FIG. 5A, the whole of [w] and partial areas of [m] and [a] in a character string [firmware] are selected as the image encrypting target area.

It should be noted that a plurality of encrypted images can be contained in the single electronic document by executing a process of associating the encrypted image with the encrypted data in the embodiment, which will be described later on. Therefore, if the electronic document extends over a plurality of pages, a so-called thumbnail 604 is displayed as a page list, whereby a listing property to the user may be enhanced.

When the encryption target area is designated, the user interface output unit 25 displays a dialog for prompting the user to input the key information on the display 108 (the illustration is omitted). Herein, the input accepting unit 26 prompts the user to input a new piece of key information or to select the key information from the previously-inputted pieces of key information, thus accepting the key information used for encrypting the area designated this time (step S102). Thereafter, the processing advances to step S103.

Figure 5B:
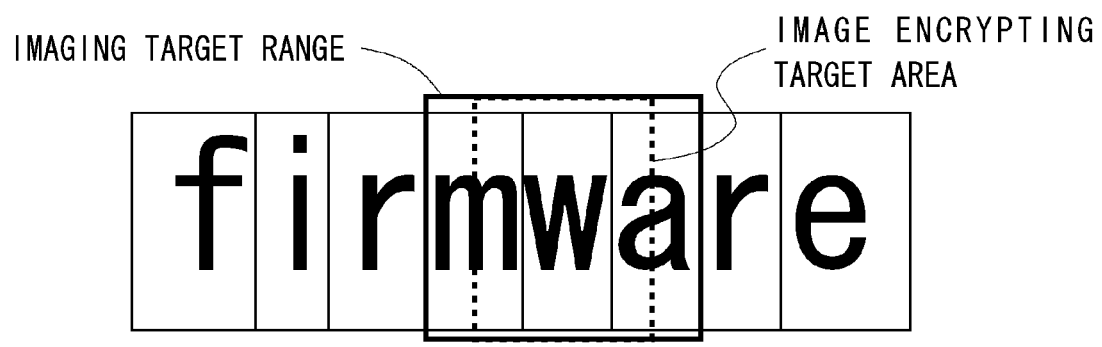
FIG. 5B is an explanatory diagram illustrating how an imaging target range is specified.

In step S103, the imaging target range is specified. The imaging target range specifying unit 24 specifies, based on the imaging target range selected by the user, the imaging target range as a digital image generating target range. FIG. 5B is a diagram illustrating how the imaging target range is specified. The imaging target range specifying unit 24 compares the information, from which the area in the electronic document can be specified, such as coordinate information and size information of the image encrypting target area selected in step S102, with positional information, indicating a display position in the image, of the respective elements such as the text and the graph contained in the displayed image of the electronic document. Then, the imaging target range specifying unit 24 specifies all of the respective displayed-on-the-image elements of which at least some are contained in the image encrypting target area, and further specifies the imaging target range so that the whole display image of the elements is contained in the range. The imaging target range is, similarly with respect to the image encrypting target area, specified by use of the information, from which the range in the electronic document can be specified, such as the coordinate information and the size information. An example in FIG. 5B is that the user selects the whole of [w] and partial areas of [m] and [a] in the character string [firmware] as the image encrypting target area on the display image, thus specifying the imaging target range so that the whole display image of [m], [w], [a] is contained in the range. Thereafter, the processing advances to step S104.

In step S104, the digital image of the imaging target range is generated. The digital image generating unit 15 generates, based on the rendering information, bitmap data of the print or display image of the imaging target range specified in step S103, thereby generating the digital image. Incidentally, on this occasion, area designating information of the image encrypting target area with respect to the digital image (corresponding to the imaging target range) is calculated from a relationship between the information (the coordinate information, the size information) enabling the image encrypting target area to be specified with respect to the display image of the whole electronic document and the information (the coordinate information, the size information) enabling the imaging target range to be specified with respect to the display image of the whole electronic document.

Herein, the term "area designating information" connotes information containing positional information etc for designating the encryption area or the decryption area in the digital image. The information used for designating the encryption area/decryption area is exemplified by positional information indicating a position in the digital image, the size information, vector information, etc. The encryption area/decryption area is designated by employing any one or more of these items of information. For instance, the encrypting process, which will be described later on, involves using 3-point positional information for designating a rectangular encryption area/decryption area area. The positional information can be expressed generally based on an x-axis and a y-axis orthogonal to the x-axis by use of units such as centimeters, inches and pixels (see FIG. 3). Further, positions from the edge of the digital image on the x-axis and the y-axis may be indicated by a percentage (%), in which a width or a length of the digital image is used as the unit. Another thinkable method is that the numbers are allocated to all the pixels of the digital image (e.g., the consecutive numbers are allocated to the pixels from the left upper pixel down to the right lower pixel) to thereby specify the position by employing this number). Upon completion of generating the digital image and calculating the area designating information, the processing proceeds to step S105.

Figure 5C:
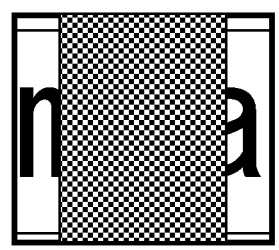
FIG. 5C is a diagram illustrating an encrypted image into which the imaging target range is transformed into a digital image and the area designating information included in the digital image is encrypted in the embodiment.

In step S105, the image encrypting target area in the digital image is encrypted. The image encrypting unit 11 encrypts, based on the encryption key accepted in step S102 and the calculated area designating information, the image encrypting target area designated in step S102 in the digital image, thereby generating the encrypted image. FIG. 5C is a diagram illustrating the encrypted image, into which the imaging target range is digital-imaged (captured as the digital image) and then the image encrypting target area contained in the digital image is encrypted, in the embodiment. According to the example in FIG. 5C, the digital image of the whole area containing [mwa] in the character string [firmware] is generated as the imaging target range, and the whole of [w] and the areas containing some portions of [m] and [a] in [mwa] are encrypted as the image encrypting target area. An in-depth description of the encrypting process will be given later on. Thereafter, the processing advances to step S106.

In step S106 and step S107, the data included in the imaging target range is extracted and encrypted. The data encrypting unit 21 extracts the data included in the imaging target range specified in step S103 (step S106). Then, the data encrypting unit 21 encrypts the thus-extracted data, thereby generating the encrypted data (step S107).

FIG. 5D is a diagram illustrating a flow of the data encryption in the embodiment. According to the example in FIG. 5D, the text information for rendering [mwa] in the character string [firmware] is extracted and encrypted by use of the key information inputted in step S102. The embodiment involves using the same key information for the image encryption and the data encryption, however, different keys may also be used. The use of the same key for the image encryption and the data encryption enables the encrypting process and the decrypting process to be easily executed without the user's being aware of a key difference. Thereafter, the processing advances to step S108.

In step S108, the encrypted data is added to the electronic document. The encrypted data storing unit 22 adds the encrypted data generated in step S107 to a metadata field of the electronic document, such as a file header. Text information, font information, etc of the information of the image-encrypted area are thereby stored in the electronic document in a restoration-enabled form with integrity. Note that a method of adding the encrypted data involves, it is preferable, adopting properly an optimal method depending on the format of the electronic document. To be specific, if the electronic document is based on PDF (Portable Document Format), a method of adding the encrypted data as non-display comment information can be adopted. Another usable method is a method of attaching an independently-defined XML (Extensible Markup Language) tag to the electronic document. Thereafter, the processing advances to step S109.

The encrypted data may, however, be added to the encrypted image and thus added to the electronic document. The encrypted image having the addition of the encrypted data is replaced with the data that becomes the encrypting target data in step S109. The method of getting the encrypted data contained in the encrypted image is exemplified by a method of containing the encrypted data as metadata into the data of the encrypted image and a method of embedding the encrypted data by way of steganography or a digital watermark. More specifically, a usable technique is that the encrypted image is segmented into blocks, average gradation data is estimated on a per-block basis with respect to a specified color, a high-and-low relationship of the average gradation data between the blocks neighboring to each other is defined as 0 or 1, and the binary data is embedded. Known other methods of embedding the data into the picture image in a hard-to-be-perceptible-manner to a person are a method using a latent image, a method using a pattern detectable by a predetermined filter, etc, in which the encrypted data can be contained in the encrypted image by properly adopting the optimal method corresponding to the embodiment.

Further, the encrypted data may be added to the electronic document by a method enabling existence of the encrypted data to be visually recognized when the electronic document is displayed or printed. The encrypted data can be added as, e.g., barcodes and information readable by an OCR (Optical Character Reader), which are displayed at an edge of the image of the electronic document.

Note that on the occasion of adding the encrypted data to the electronic document, the encrypted image is associated with the encrypted data. For instance, the association can be done by a method of attaching the same identifier to each of a data header of the encrypted image and the encrypted data, a method of attaching information indicating the position, within the document, of the encrypted data to the encrypted data, and so on. The association may be conducted other methods. This scheme is flexible to a case where the single electronic document includes the plurality of encrypted images.

In step S109, the data of the imaging target range in the electronic document is replaced with the encrypted image. The encrypted electronic document generating unit 23 replaces the data of the imaging target range specified in step S103 with the encrypted image generated in step S105. With this replacement, it follows that when the encrypted electronic document finally generated by the encrypting process illustrated in this flowchart is displayed, the associated encrypted image is displayed in the imaging target range embracing the image encrypting target area selected by the user in place of the content displayed in the original electronic document.

FIG. 5E is a diagram illustrating the content of the encrypted electronic document generated in the embodiment. According to the example depicted in FIG. 5E, it is recognized that the text data of [mwa] included in the imaging target range in the character string [firmware] is replaced with the encrypted image, and further the encrypted data encrypted as the binary data of the removed text data of [mwa] is added to within the electronic document. Thereafter, the processing advances to step S110.

In step S110 and step S111, the area designating information of the image encrypting target area is added to the electronic document, and the encrypted electronic document, which is generated, is output. The encrypted data generating unit 23 adds the area designating information specifying the position of the image encrypting target area in the encrypted image to the metadata field of the file header of the electronic document or the data header of the encrypted image, or alternatively embeds the area designating information into the image of the encrypted image by way of the steganography or the digital watermark (step S110). Then, the output unit 12 outputs the electronic document including the encrypted image, which has been generated in step S108 through step S110, to the storage device such as the HDD 103 as the encrypted electronic document (step S111). Note that the output unit 12 may print and output the encrypted electronic document to the paper medium by use of the printer 107.

Figure 5F:
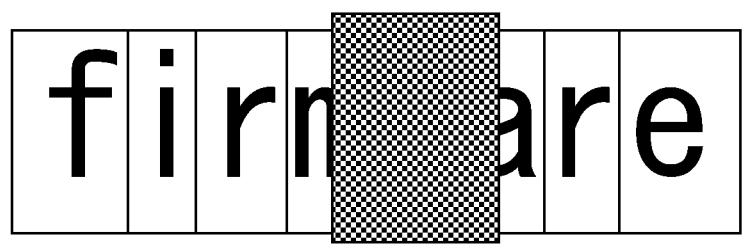
FIG. 5F is a diagram illustrating a display image of the encrypted electronic document generated in the embodiment.

FIG. 5F is a diagram illustrating the display image of the encrypted electronic document generated in the embodiment. When the encrypted electronic document depicted in FIG. 5E is display-output to the display 108 or print-output to the paper medium by employing the printer 107, the encrypted image illustrated in FIG. 5C is displayed in the position in which to display the character string [mwa] by interpreting the text information and the font information before the encryption (see FIG. 5A). Thereafter, the process illustrated in the flowchart is finished.

Figure 6A:
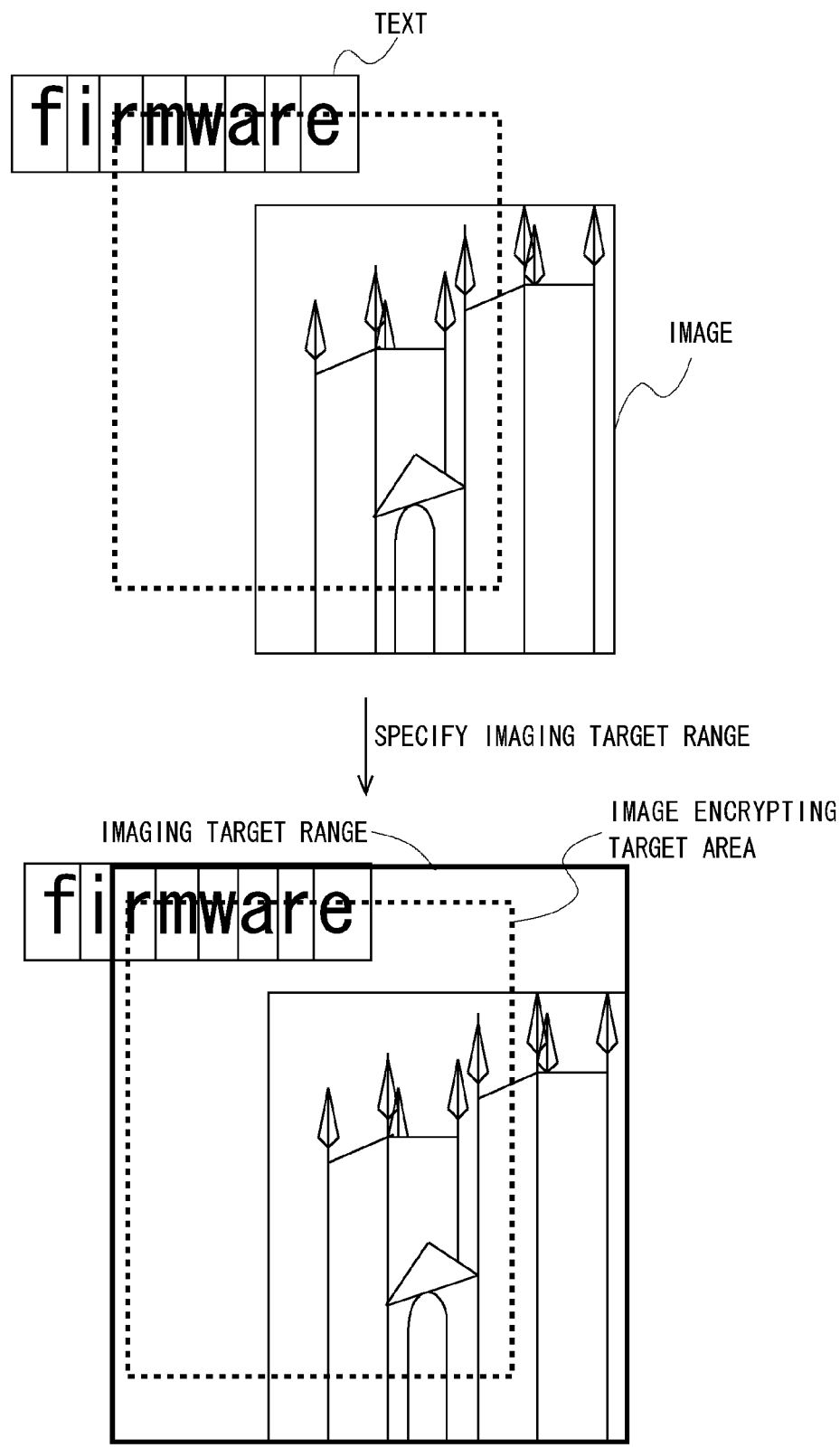
FIG. 6A is a diagram A illustrating a flow of selecting the image encrypting target area and finally generating the encrypted electronic document.
Figure 6C:
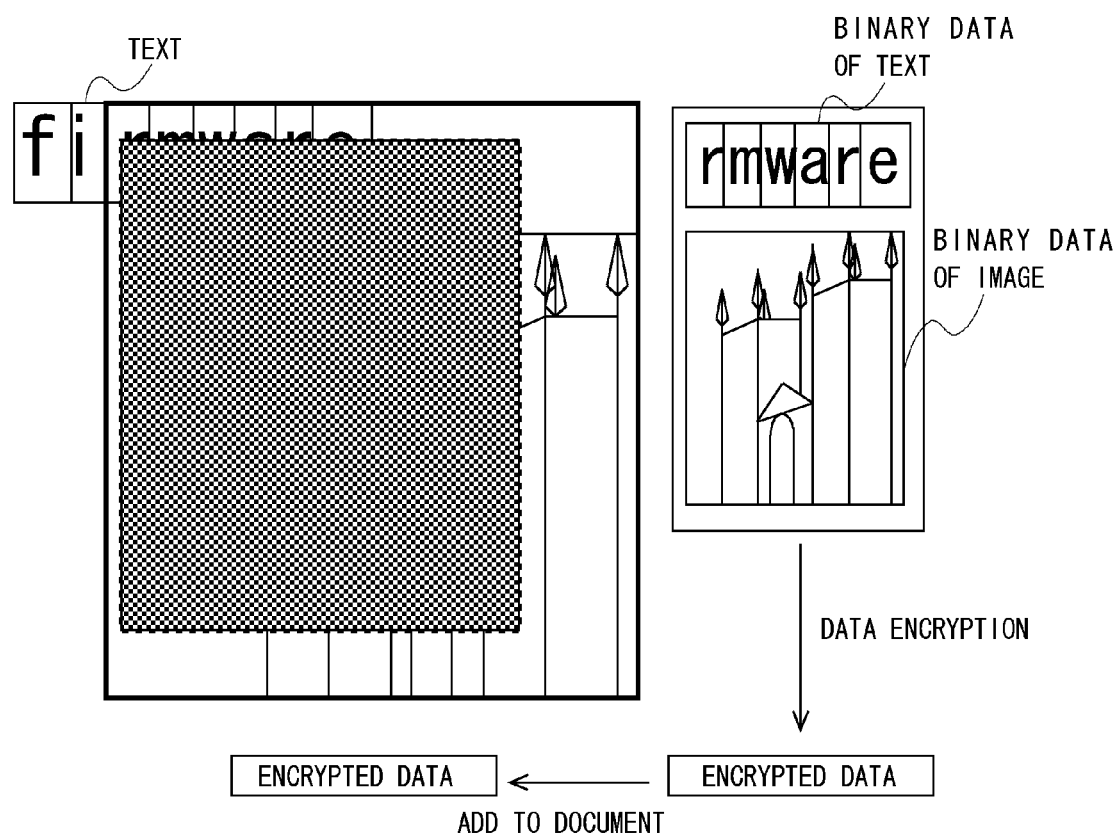
FIG. 6C is a diagram C illustrating a flow of selecting the image encrypting target area and finally generating the encrypted electronic document.

The discussion made above has given the more detailed description of the case where the segment of the character string in the electronic document is selected with reference to the diagrams illustrated in FIGS. 5A through 5F, however, the details of the processing are substantially the same as in the case of including an image of a photo or an illustration etc in the selected range. FIGS. 6A through 6C are diagrams for illustrating a flow of selecting the image encrypting target area and finally generating the encrypted electronic document in the embodiment. According to FIGS. 6A through 6C, in the case where the image encrypting target area includes a part of the image of the photo or the illustration etc and a part of the character string, it is recognized that all of the characters and the photo or the illustration etc of which at least some portions are included in the image encrypting target area, are specified as the imaging target range (see FIG. 6A) and then digital-imaged. Subsequently, the image encrypting unit 11 encrypts the image of the area corresponding to the image encrypting target area in the digital image in the imaging target range, and the data encrypting unit 21 encrypts of the data of the character string and the image that are included in the imaging target range (see FIG. 6B). Finally, the encrypted data storing unit 22 executes an adding process of the encrypted data, and the encrypted electronic document generating unit 23 executes a replacing process using the generated encrypted image, whereby the encrypted electronic document is generated (see FIG. 6C).

Figure 7:
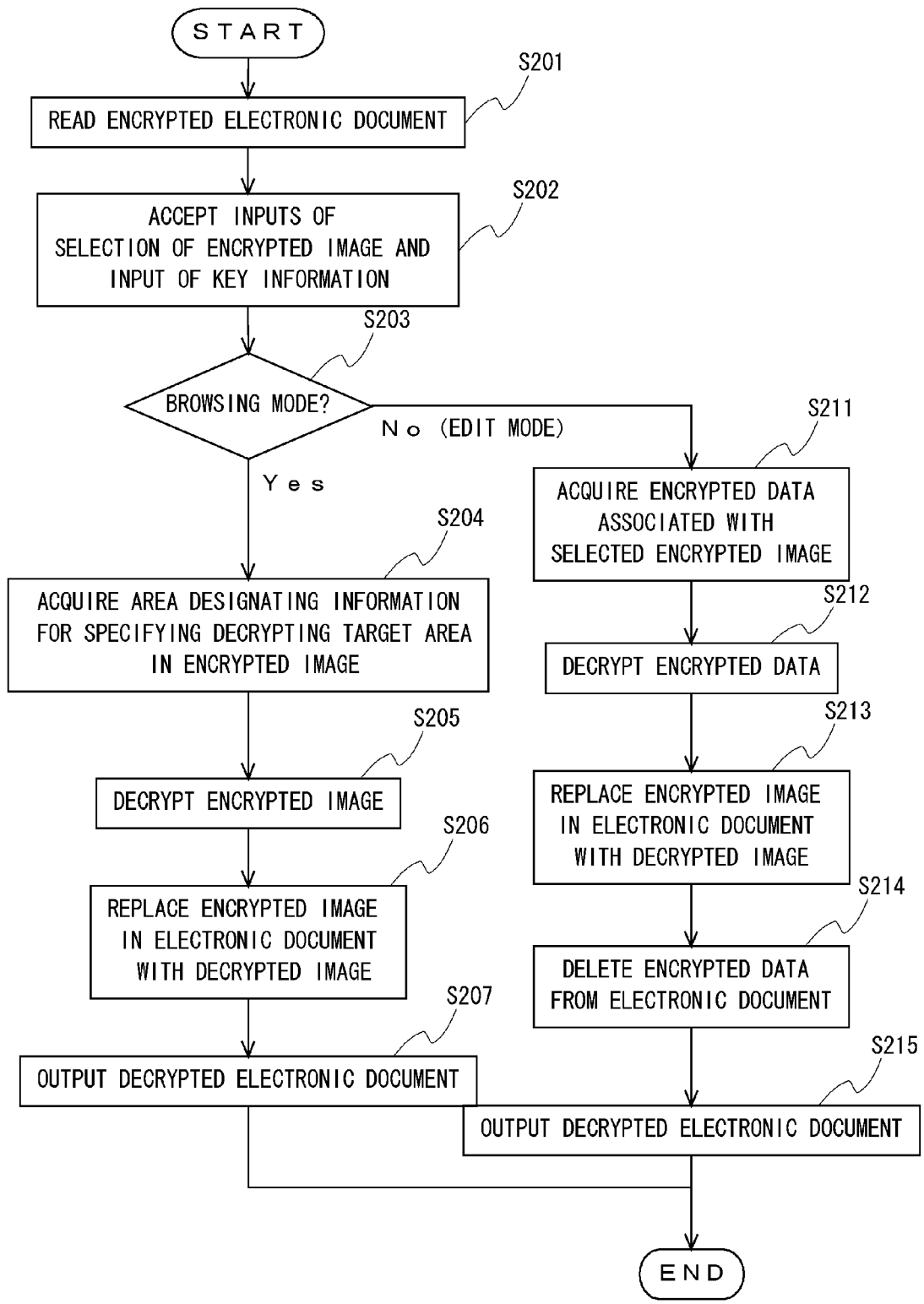
FIG. 7 is a flowchart illustrating a flow of a decrypting process in the embodiment.

FIG. 7 is a flowchart illustrating a flow of the decrypting process in the embodiment. A start of the process illustrated in this flowchart is triggered by an event that the user designates the encrypted electronic document generated by the process etc depicted in FIG. 3 as the decrypting target document. Incidentally, on this occasion, the user designates the document in a way that specifies any one of a browsing mode and an edit mode as an electronic document processing mode.

In step S201 and step S202, the electronic document is displayed, and the selection of the encrypted image and the input of the key information are accepted. The user interface output unit 25 reads the electronic document designated by the user from the HDD etc and thus generates the rendering information. Then, the user interface output unit 25, for prompting the user to select the encrypted image, generates a preview screen 600b based on the rendering information and displays the preview screen 600b on the display 108 (step S201).

Figure 8:
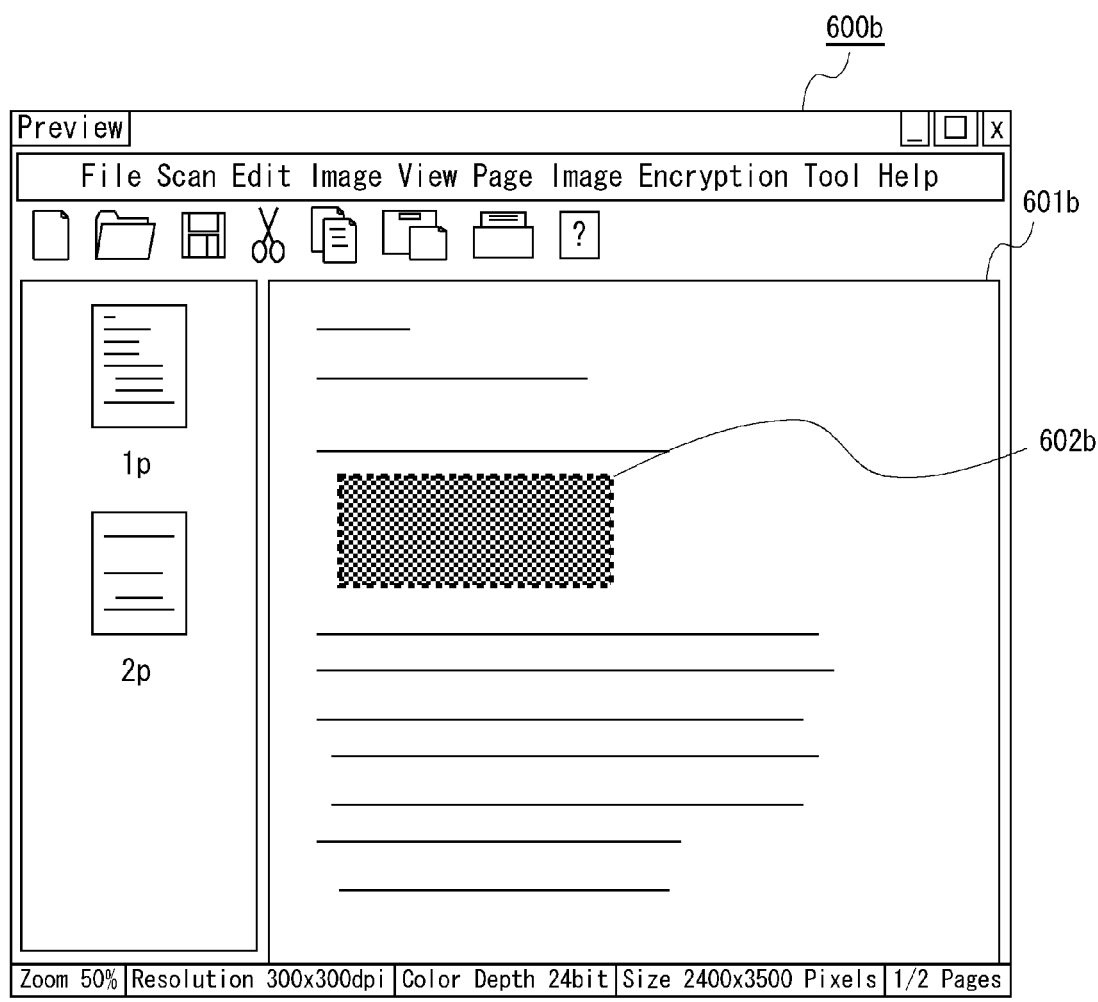
FIG. 8 is a diagram illustrating a preview screen of the encrypted image, which is displayed for selecting the encrypted image, in the embodiment.

FIG. 8 is a diagram illustrating the preview screen 600b of the encrypted image displayed for selecting the encrypted image. An image 601b of the encrypted electronic document, which is used for selecting the encrypted image, is displayed on the preview screen 600b, and the user can easily designate a decrypting target encrypted image 602b by selecting the digital image contained in the encrypted electronic document by use of the input device such as the mouse 110. The encrypted image is the image element embedded into the encrypted electronic document and can be therefore easily selected by a clicking operation.

When the decrypting target encrypted image 602b is designated, the user interface output unit 25 displays a dialog for prompting the user to input the key information on the display 108 (the illustration is omitted). The input accepting unit 26 accepts the key information used for decrypting the area designated this time by making the user input a new piece of key information (decryption key) or select the key information from the previously-inputted pieces of key information (step S202). Thereafter, the processing advances to step S203.

In step S203, it is determined whether the mode designated by the user when opening the encrypted electronic document is a browsing mode or not. In the embodiment, the processing mode, which can be designated when opening the electronic document, is the browsing mode or an edit mode, and hence, if the browsing mode is not designated, it follows that the edit mode is to be designated. If the processing mode designated by the user is determined to be the browsing mode, the processing proceeds to step S204. If the designated processing mode is determined to be not the browsing mode but the edit mode, the processing proceeds to step S211.

In step S204, the area designating information specifying the decrypting target area in the encrypted image is acquired.

The encrypted image acquiring unit 13 acquires the area designating information (which is acquired from the position added in step S110 in the encrypted electronic document generating process) from the electronic document designated by the user's operation. Thereafter, the processing advances to step S205.

In step S205, the encryption is carried out. The image decrypting unit 14 decrypts the decrypting target area specified by the area designating information acquired in step S204 in the encrypted image on the basis of the decryption key inputted in step S202, thereby generating the decrypted digital image. The decrypting target area may, however, be automatically selected. The image decrypting unit 14 can detect the decrypting target area in the encrypted image and can specify the position thereof on the basis of the regularity, exhibited by the image in the decryption area, with which the pixel values are regularly converted on the occasion of the encrypting process and a marker etc added for specifying the position in the decryption area. An in-depth description of the decrypting process will be given later on. Thereafter, the processing advances to step S206.

In step S206 and step S207, the encrypted image in the electronic document is replaced by the decrypted image, and the generated decrypted electronic document is output. The output unit 12 outputs the decrypted electronic document, into which the encrypted image selected in step S202 is replaced with the digital image generated in step S205, to the display etc (the decrypted electronic document may also be output to the storage device such as the HDD 103). With this contrivance, it follows that the decrypted digital image with its content being readable is displayed, in place of the encrypted image, in the position where the encrypted image selected by the user has been displayed before the decryption. Thereafter, the process illustrated in the flowchart is terminated.

In step S211 and step S212, the encrypted data associated with the selected encrypted image is acquired and then decrypted. The encrypted data acquiring unit 27 seeks out the encrypted data associated with the encrypted image selected in step S202 from the position, added in step S108, of the file header etc of the electronic document and thus acquires the encrypted data (step S211). Note that the encrypted data might be acquired out of the steganography or the digital watermark embedded in the encrypted image or the meta-information of the image in some cases. Then, the data decrypting unit 28 restores the plaintext (the decrypted data) before being encrypted by decrypting the acquired encrypted data (step S212). The decryption of the data can be done based on the cryptography (the AES, the DES, etc) used for the encryption and the key information. Thereafter, the processing advances to step S213.

In step S213, the encrypted image in the electronic document is replaced with the decrypted data. The decrypted electronic document generating unit 29 replaces the encrypted image selected in step S202 with the decrypted data generated in step S212. With this contrivance, in the case of displaying the decrypted electronic document that is finally generated in the decrypting process illustrated in the flowchart, it follows that the edit-enabled decrypted data is displayed, in place of the encrypted image based on the respective elements, organizing the original electronic document before executing the encrypting process, such as the text information and the font information, in the position where the encrypted image selected by the user has been displayed. Thereafter, the processing advances to step S214.

In step S214 and step S215, the encrypted data is deleted from the electronic document, while the decrypted electronic document is output. The decrypted electronic document generating unit 29 deletes the encrypted data from the file header of the electronic document (step S214), and the output unit 12 outputs, to the storage device such as the HDD 103, the edit-enabled electronic document restored in the original status before being encrypted, which is generated in the process up to step S214 as the decrypted electronic document (step S215). Thereafter, the process illustrated in the flowchart is finished.

Figure 9:
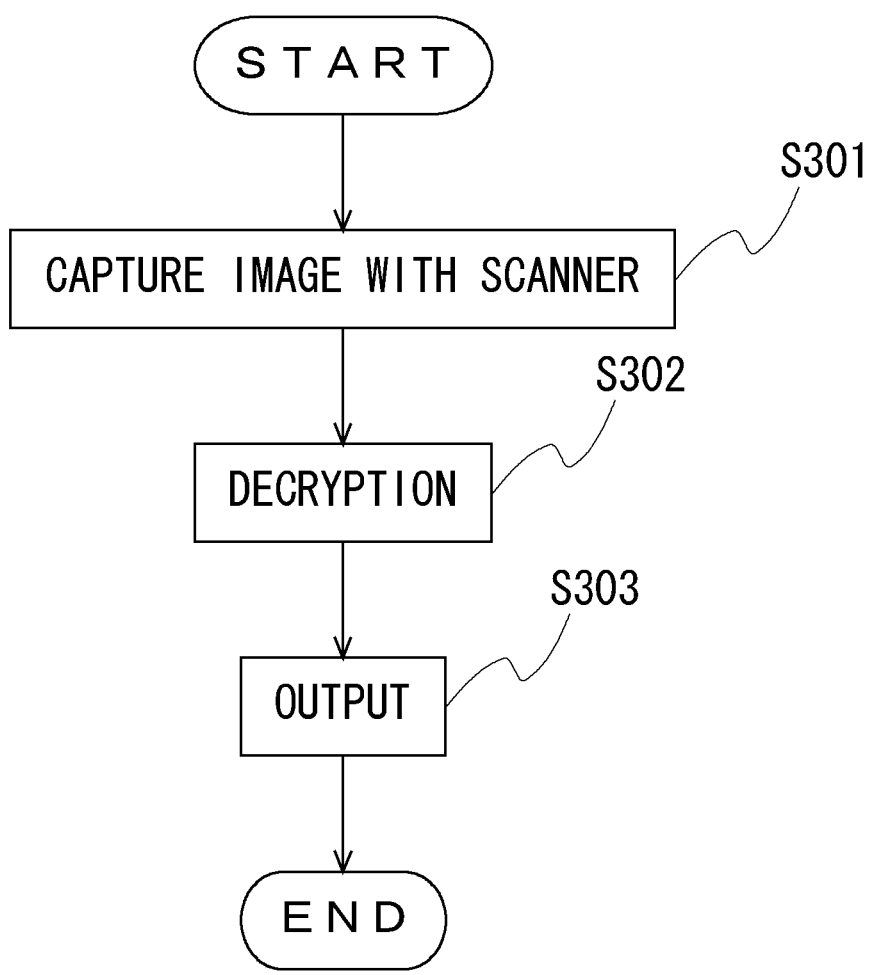
FIG. 9 is a flowchart illustrating a low of a paper medium information decrypting process in the embodiment.

FIG. 9 is a flowchart illustrating a flow of a paper medium information decrypting process in the embodiment. A start of the process depicted in the flowchart is triggered by an event that the user acquires the image of the document by use of a device such as the scanner 106 and a digital camera capable of capturing the image of the paper medium in order to perform the decryption from the paper medium to which the encrypted electronic document is printed and thus output.

In step S301, the document image is acquired. The user, after setting the paper medium recorded with a want-to-decrypt encrypted image on the device such as the scanner 106 and the digital camera capable of capturing the image of the paper medium, gives an acquisition start instruction via the interface of the computer 100. The encrypted image acquiring unit 13 accepting the input of the instruction captures the image of the paper medium by controlling the scanner 106 etc and converts an image-captured result (imaging result) into the digital image, thus acquiring the information on the paper medium as the encrypted image. Thereafter, the processing advances to step S302.

In step S302, the decryption is carried out. The image decrypting unit 14 detects the encrypted area in the image of the document and decrypts this area, thereby generating the decrypted digital image. The encrypted portion included in the acquired document image is provided with the regularity and attached with the marker added on the occasion of encrypting the image, and hence the decrypting target area is automatically selected. An in-depth description of the decrypting process will be made later on. Thereafter, the processing advances to step S303.

In step S303, the image of the decrypted document is output. The computer 100, with the CPU 101 executing a paper medium information decryption program, outputs the digital image generated in step S302. Thereafter, the process illustrated in the flowchart is terminated.

Thus, the encrypted area is automatically detected, and the detected area is decrypted, thereby enabling only the user who knows the decryption key to browse the information written in the encrypted area. After the scanner has captured the image, however, the preview screen 600b is displayed, and the decryption area may be determined based on the area selected by the user. Decryption accuracy can be improved by adding the auto detecting process of the decryption area to the area selected by the user.

According to the embodiment, the important information can be prevented from being leaked out without harming the convenience of the electronic document printable on the paper medium.

Further, the electronic document processing system 900 according to the embodiment can restore the pre-encrypting electronic document and can execute the decryption from the printed paper medium etc and therefore eliminates the necessity for a must-do-operation of selecting the technique used for the encryption depending on the application, thereby enabling the user to create the encrypted electronic document with less of operations without being aware of handling the post-encrypting electronic document.

It should be noted that the encrypted data is added and thus stored in the encrypted electronic document in the embodiment discussed above, however, the encrypted data may be stored in the auxiliary storage device such as the HDD 103 as the data independent of the encrypted electronic document and may also be stored in a server (its illustration is omitted) connected via the network. In the case of storing the encrypted data in a location outside the encrypted electronic document, the encrypted data is required to be stored in the way of being associated with information from which the encrypted electronic document can be identified. For example, an identifier is attached to the header of the document, and the encrypted data is stored in the way of being associated with this identifier.

Note that the different encryption keys are used for encrypting the different areas, whereby the electronic document can be encrypted by performing the access control based on the encryption key and setting a security level.

<Encrypting Unit and Decrypting Unit>

Next, an outline of the encrypting process and the decrypting process by the image encrypting unit and the image decrypting unit in the embodiment will be described. Herein, the encrypting unit 11 and the decrypting unit 14 explained herein correspond to the image encrypting unit 11 and the image decrypting unit 14 in the embodiment discussed above. The processes of the data encrypting unit 21 and the data decrypting unit 28 can, as explained above, involve conducting the encryption by utilizing the binary data encryption technique typified by the AES etc.

Figure 10:
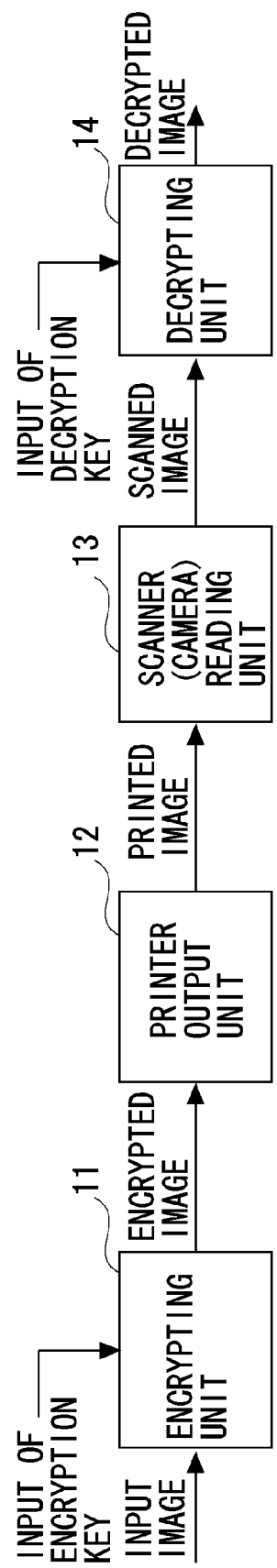
FIG. 10 is a diagram showing a processing outline (part 1) of the encrypting process and the decrypting process.

FIG. 10 is a diagram showing a processing outline (part 1) of the encrypting process and the decrypting process. In FIG. 10, the encrypting unit 11 (which is referred to as an encrypting unit 11A, encrypting unit 11B and an encrypting unit 11C in first through third modes, respectively) outputs the encrypted image into which part of the digital image has been encrypted on the basis of the inputted digital image and the encryption key specifying the encrypting method. The printer output unit 12 prints the digital image encrypted by the encrypting unit 11 on a printable physical medium such as the paper. The scanner (camera) reading unit 13 reads the printed image output by the printer output unit 12 by employing the scanner or the camera.

Then, the decrypting unit 14 (which is termed a decrypting unit 14A, a decrypting unit 14B and a decrypting unit 14C in the first through third modes, respectively) obtains the printed image output by the printer output unit and the decrypted image with the inputted decryption key. As far as the inputted decryption key is valid, the encrypted image can be properly decrypted, and the information hidden with the encryption by the encrypting unit 11 gets visible.

Figure 11:
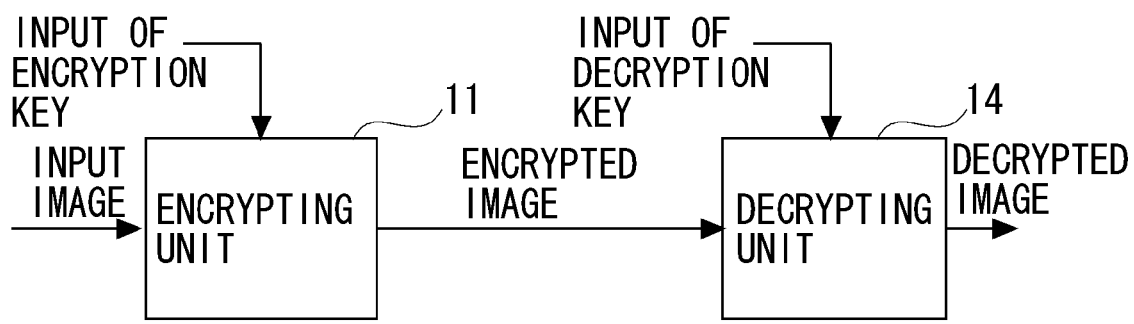
FIG. 11 is a diagram showing a processing outline (part 2) of the encrypting process and the decrypting process.

FIG. 11 is a diagram showing a processing outline (part 2) of the encrypting process and the decrypting process. As shown in FIG. 11, the encrypting process and the decrypting process in the first through third modes to which the present invention is applied, enable the decrypted image to be acquired by inputting the digital image encrypted by the encrypting unit 11 in an as-is state of the electronic document image without via the printer and the scanner to the decrypting unit 14.

Next, the first through the third modes to which the present invention is applied will be described, respectively. To begin with, the first mode to which the present invention is applied will be described.

Figure 12:
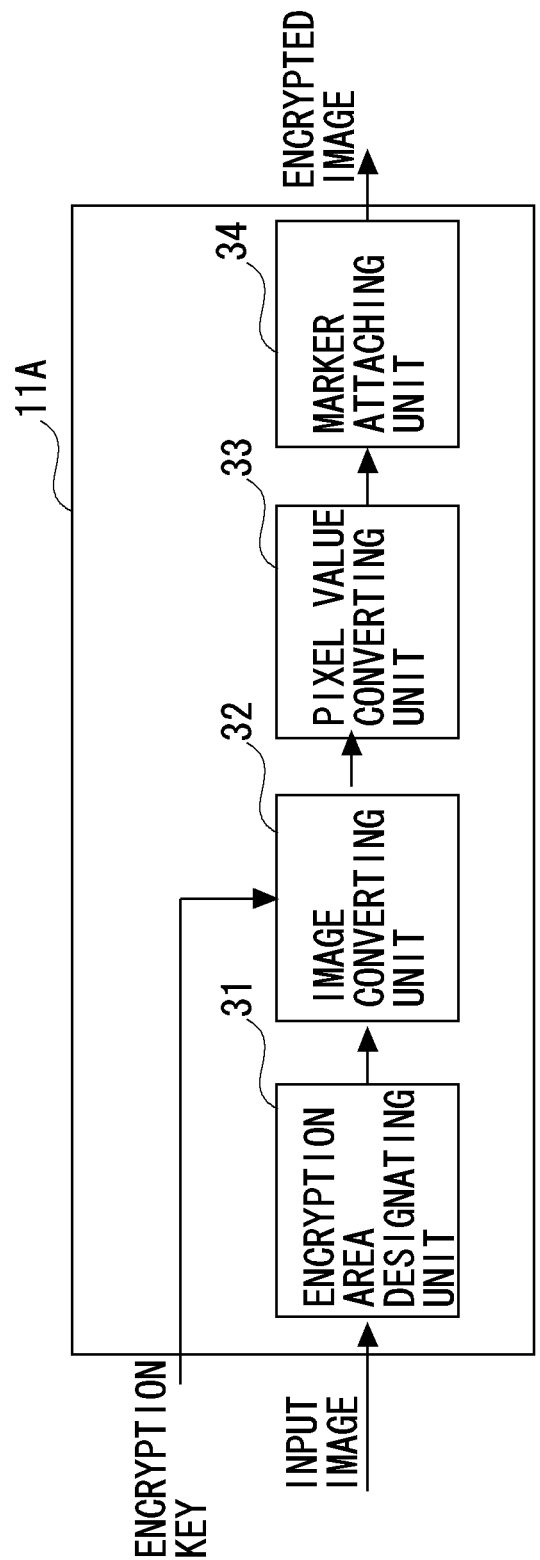
FIG. 12 is a diagram showing an outline of the encrypting process in a first mode.

FIG. 12 is a diagram illustrating an outline of the encrypting process in the first mode. In FIG. 12, the encrypting unit 11A includes an encryption area determining (designating) unit 31, an image converting unit 32, a pixel value converting unit 33 and a marker adding unit 34.

The encryption area designating (determining) unit 31 selects an area to be encrypted from the inputted image containing the want-to-encrypt area.

Figure 13:
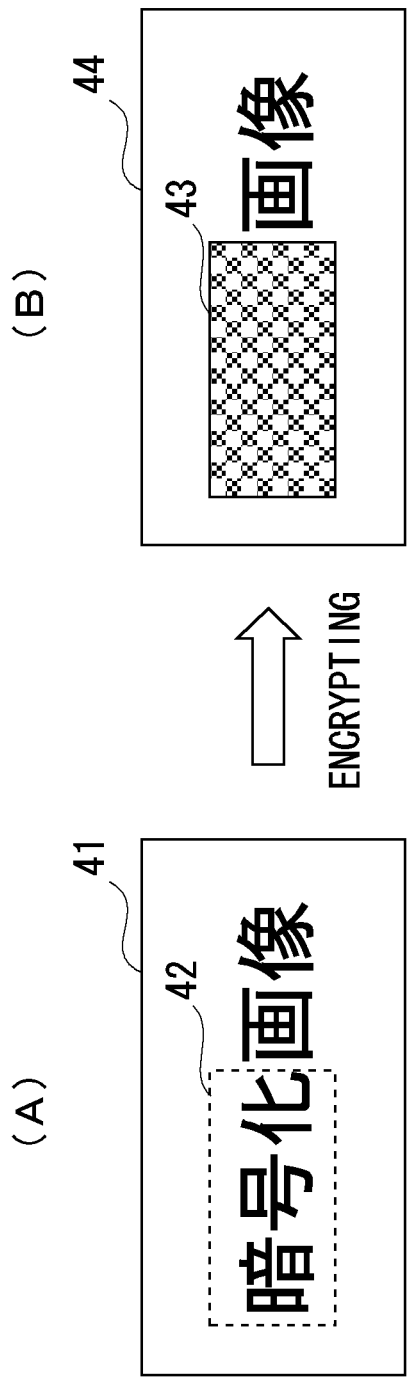
FIG. 13 is a diagram showing an example of selecting an encryption area.

FIG. 13 is a diagram showing an example of selecting the encryption area. To be specific, the encryption area designating unit 31 selects, as illustrated in (A) of FIG. 13(A), an area 42 to be encrypted out of a digital image (inputted image) 41 containing the want-to-encrypt area. The area 42 is converted into a converted image 43 as illustrated in (B) of FIG. 13 by the processes of the image converting unit 32 and the pixel value converting unit 33 that will hereinafter be described, and the digital image 41 is converted into an encrypted image 44 containing the converted image 43.

The discussion gets back to the description in FIG. 12. When the encryption area designating unit 31 selects the area 42 to be encrypted, the image converting unit 32 inputs the to-be-encryption area 42 and the encryption key, and visually converts the an image of the to-be-encryption area 42 by a converting method associated with the encryption key. A conversion parameter on this occasion is generated based on binary data obtained from the inputted encryption key.

Figure 14:
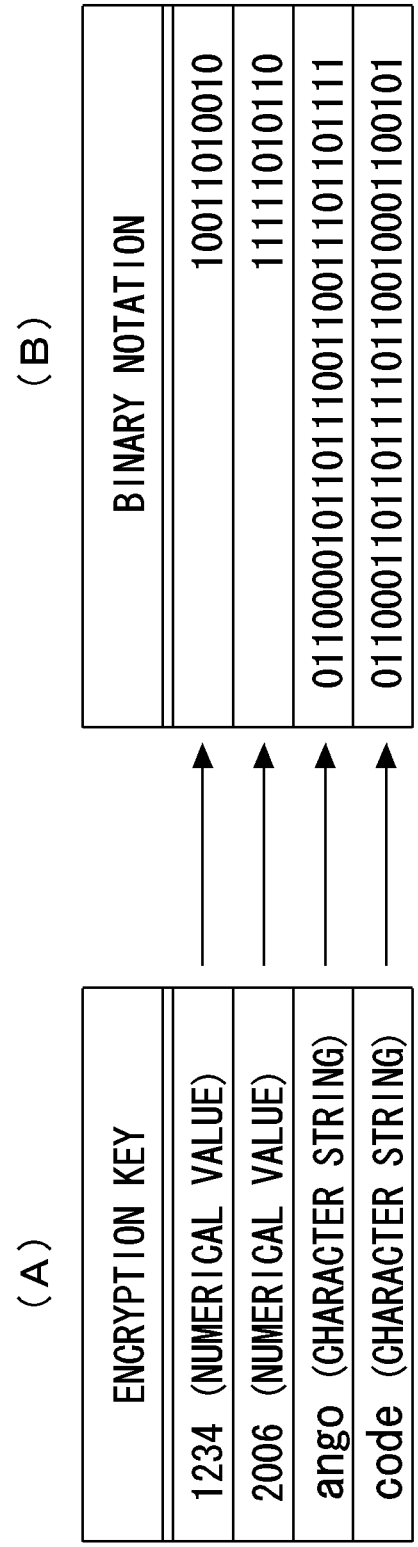
FIG. 14 is a diagram showing an input example of the encryption key.

FIG. 14 is a diagram showing an example of inputting the encryption key. FIG. 14 shows an example of the encryption key and an example of the binary data generated from the encryption key. For example, a numeric value [1234] used as the encryption key is inputted in the form of binary data [100011010010], and a character string [ango] as the encryption key is inputted in the form of binary data [01100001011011100110011101101111].

The first mode exemplifies, as the image converting methods, two converting methods, i.e., one method based on a process (called a scramble process) of segmenting the image into micro areas and rearranging the micro areas and another method based on an image compression process.

To start with, the scramble process will be described. The scramble process is that at first the image of the selected area 42 is segmented into the micro areas each having a fixed size, and next the micro areas are rearranged based on the binary data obtained from the encryption key.

Figure 15:
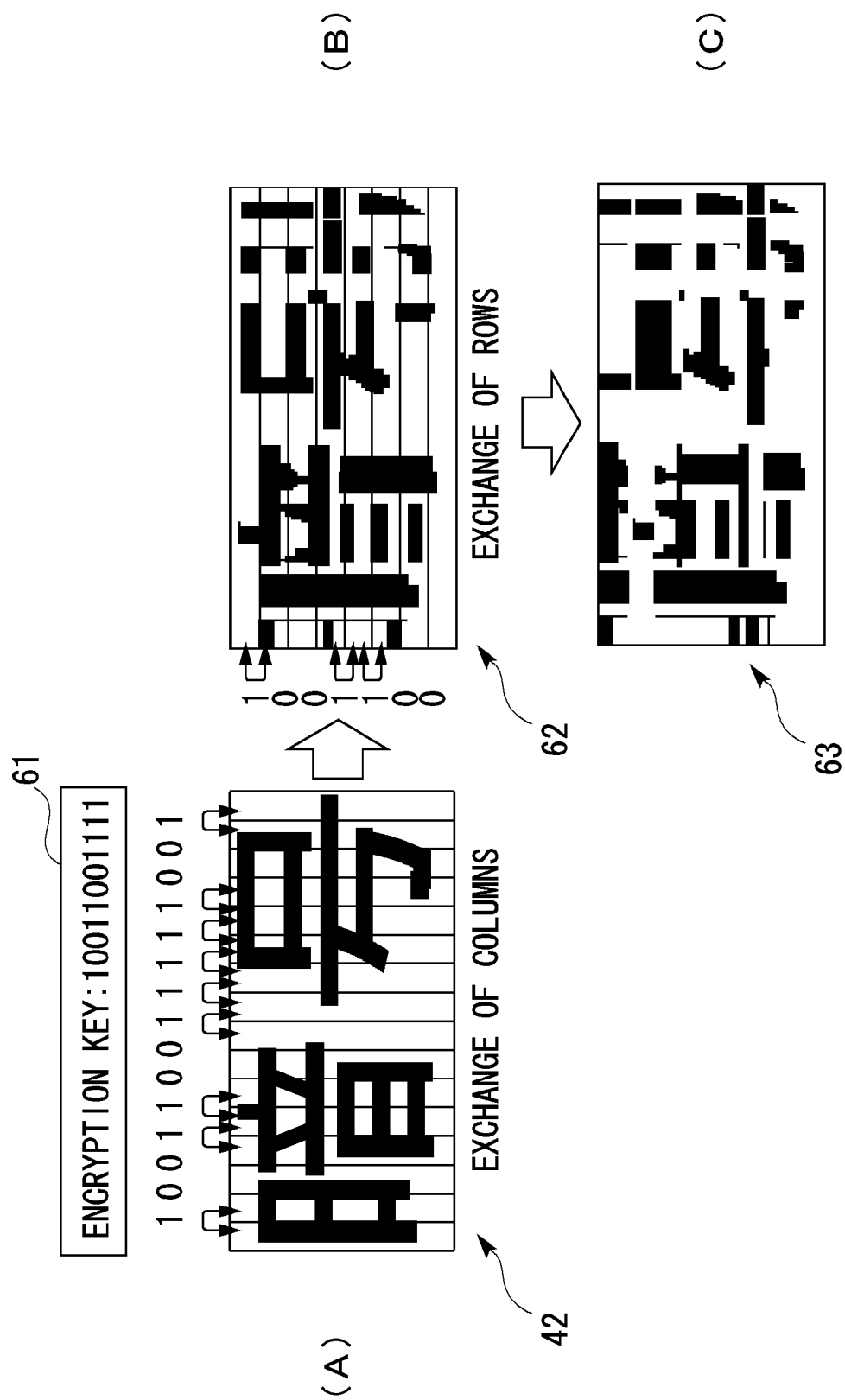
FIG. 15 is a diagram showing one example of a scramble process in an image converting unit.

FIG. 15 is a diagram showing one example of the scramble process by the image converting unit. As shown in (A) of FIG. 15, at the first onset, the area 42 selected by the encryption area designating unit 31 is segmented in a vertical direction, respective bits of a binary string of the encryption key 61 are set corresponding to borders between the segmented areas (micro areas) 42 in sequence from the left, when the bit is [1], neighboring segmented columns (segmented areas) are exchanged with each other, and, when the bit is [0], an execute-nothing-process is conducted in sequence from the left side. If the bit count of the binary string is insufficient for a segmentation border count, the same binary string is repeated from a position where the insufficiency occurs, thus performing the exchanging process up to the right end of the area 42.

Subsequently, as shown in (B) of FIG. 15, an image area 62 undergoing the exchange process is segmented in a horizontal direction, the respective bits of the binary string of the encryption key 61 is set corresponding to the boarders between the segmented image areas 62 in sequence from above, and the same exchanging process as done for the vertical segmentation is executed sequentially from above on a row-by-row basis.

Then, as illustrated in (C) of FIG. 15, as a result of executing the exchanging process on the individual segmented images, a scramble image 63, defined as a processed image into which the original area 42 has been subjected to the scramble process, is acquired.

An extension method of this exemplified scramble process can involve executing the scramble process twice or more both in the horizontal direction and in the vertical direction, and can further involve changing the size of the segmented area in the exchange conducted from the second time onward. Moreover, different binary strings can be also employed for exchanging the segmented areas in the horizontal direction and in the vertical direction. These extension methods are, if a size of the inputted image is small while a bit length of the encryption key is large, effective especially as a means for preventing absolutely the same processed image from being generated based on the different encryption key.

Figure 16:
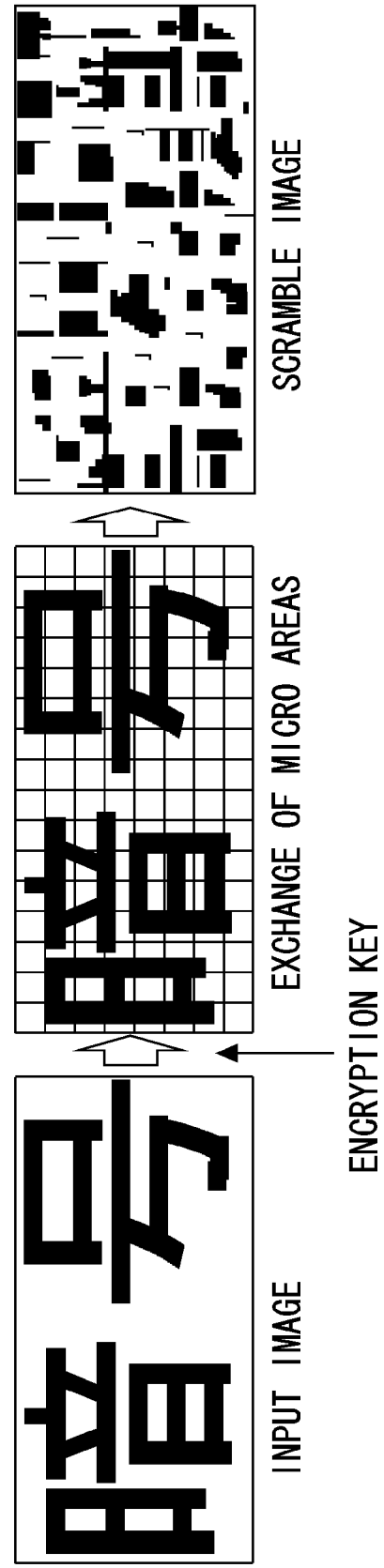
FIG. 16 is a diagram showing another example of the scramble process in the image converting unit.

FIG. 16 is a diagram illustrating another example of the scramble process in the image converting unit. A method of exchanging the pixels on the unit of the micro area as illustrated in FIG. 16 can be used as another scramble processing method different from the scramble process explained with reference to FIG. 15. More specifically, the inputted image is segmented into the micro areas each taking a rectangular shape, and the segmented micro areas are exchanged with each other. This scheme has a greater scrambling count and enables strength of the encryption to a greater degree than by the method of conducting the exchanges in the horizontal direction (row) and in the vertical direction (column) described above.

Figure 17:
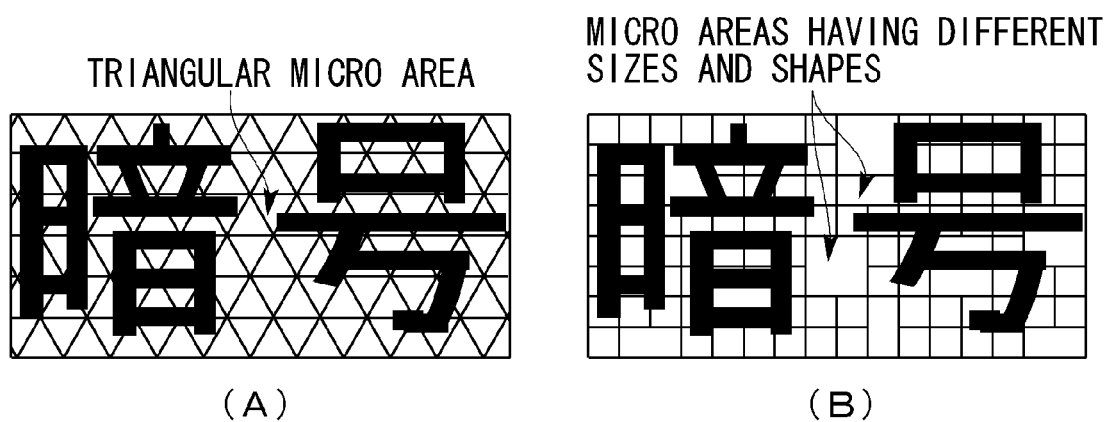
FIG. 17(A)-(B) are diagrams showing a modified example of a shape of a micro area in the scramble process.

FIG. 17 is a diagram showing modified examples of the shape of the micro area in the scramble process. Further, the shape of the micro area when executing the scramble process can include, e.g., a triangle as illustrated in (A) of FIG. 17 in addition to the rectangle illustrated in FIG. 16. Moreover, as illustrated in (A) of FIG. 17, the micro areas having different shapes and different sizes can coexist as shown in (B) of FIG. 17.

Next, the converting method based on the image compressing process will be described.

Figure 18:
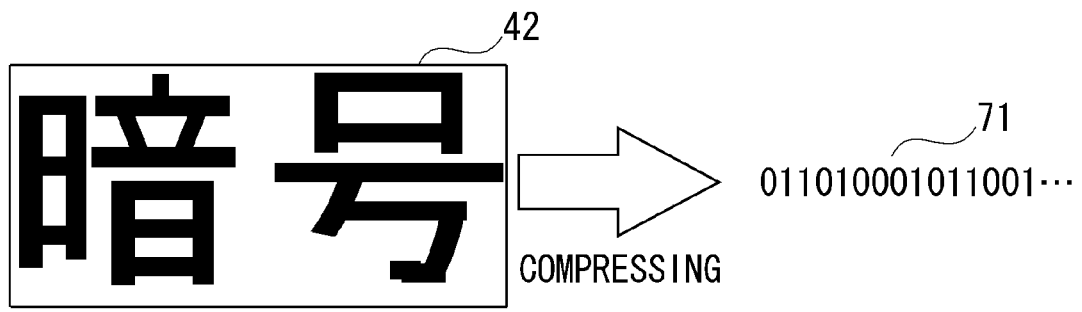
FIG. 18(A)-(B) are diagrams showing a compressing process in the image converting unit.

FIG. 18 is a diagram showing a compression process in the image converting unit. When the input image 41 is a binary image, at first, as illustrated in (A) of FIG. 18, a binary string 71 as shown in (B) of FIG. 18 is generated by compressing an image of the area 42 selected by the encryption area designating unit 31. A compression method herein can involve applying all types of compression methods such as a run-length compression method used for transferring binary image data in a facsimile apparatus and a JBIG (Joint Bi-level Image experts Group) compression method defined as a standard compression method for the binary image.

Figure 19:
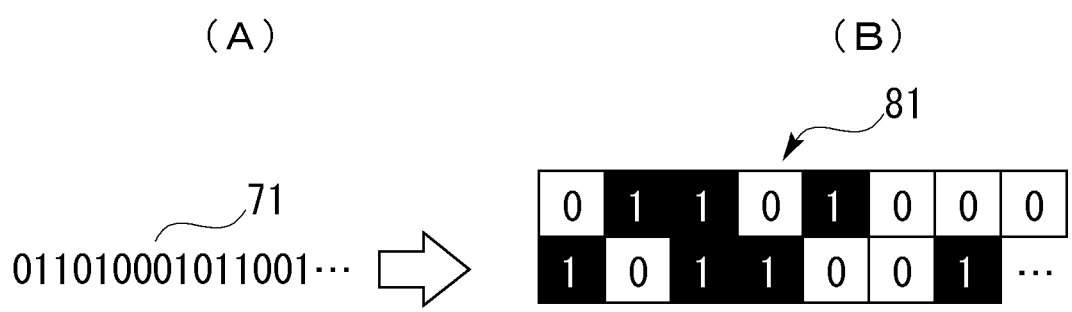
FIG. 19(A)-(B) are diagrams showing a process of transforming converted image into an image.

FIG. 19 is a diagram showing a process of transforming the converted data into the images. As shown in FIG. 18, subsequent to the compression of the area 42, the respective bits of the binary string 71 defined as the converted compression data are arrayed as black-and-white square images 81 in the area 42 of the image to be encrypted in a way that generates the square images (processed images) 81 by enlarging [0] bits as [white] squares and [1] bits as [black] squares in a designated size as illustrated in (B) of FIG. 19.

If desired to array the converted compression data (binary string 71) within the image of the selected area 42, the size of the square image 81 depends on a compression rate of the selected area 42. For example, if the compression rate is equal to or smaller than ¼, the size of the square image 81 is equivalent to (2×2) pixels at most, and, if equal to or smaller than ¹⁄₁₆, the size is equivalent to (4×4) pixels at most.

On the other hand, if desired to designate the size of the square image 81 and to arrange the compressed data within the image of the area 42, it is necessary for attaining a compression rate depending on the size of the square image 81 in the first image compression process. In the case of setting the square to, e.g., a (4×4) pixel size, the compression rate equal to or larger than ¹⁄₁₆ is needed. In this case, effective methods are a method of previously compressing the information in the selected area 42 and an irreversible compression method.

The encryption process of transforming the compressed data into the image in enlargement enables the enlarged black-and-white blocks to be recognized even when reading the encrypted image with, e.g., a low-resolution camera, and hence the encrypted image can be correctly decrypted.

The discussion gets back to the illustration in FIG. 12. A pixel value converting unit 33 converts at the fixed intervals the pixels within the processed image 63 converted by the image converting unit 32, thus making the converted image 43 take substantially a grating-shaped stripped pattern.

Figure 20:
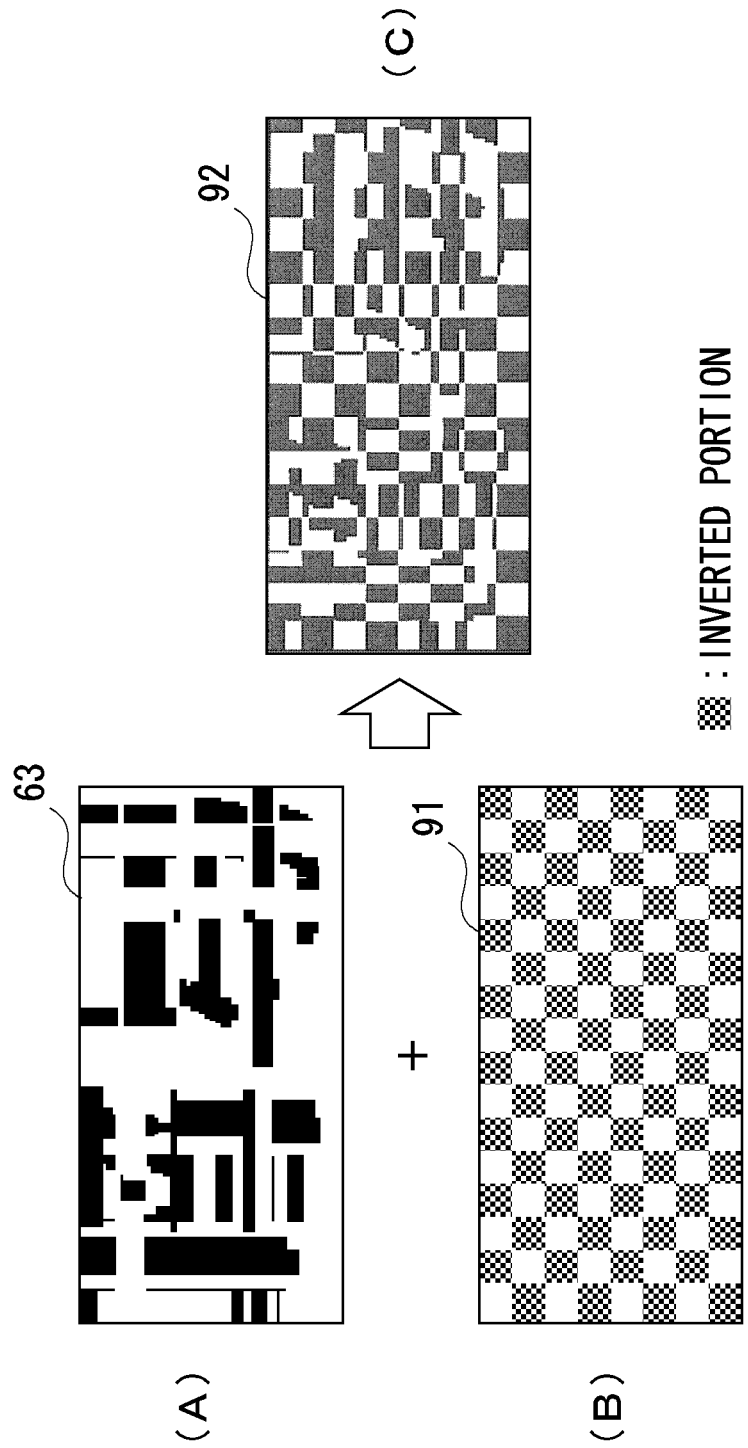
FIG. 20(A)-(C) are diagrams showing an example (part 1) of a pixel value converting process in a pixel value converting unit.

FIG. 20 is a diagram showing an example (part 1) of a pixel value converting process. The pixel value converting unit 33 converts at the fixed intervals the pixels of the processed image 63 into which the area is scrambled by the image converting unit 32, whereby the encrypted image 44 takes substantially the grating-shaped stripped pattern as a whole. For example, as illustrated in FIG. 20, a converted image 92 in which the encrypted image 44 takes substantially the grating-shaped stripped pattern on the whole is acquired as shown in (C) by executing such conversion that the scramble image 63 shown in (A) of FIG. 20 is inverted (inversion process) with colored portions of a checkered pattern image 91 illustrated in FIG. (B). The stripped pattern to be generated is thereby used for detecting minute positions of the respective pixels within the encryption area when decrypting the encrypted image 44.

Another conversion can be carried out for a series of these processes. For example, the process of inverting the pixel values may also be a process of adding a designated value.

Further, a checkered pattern image 91 illustrated in (B) of FIG. 20 has substantially the same size as the scramble image 63 shown in (A) has, however, only the central area, excluding the peripheral area, of the scramble image 63 may also be subjected to the inverting process.

Figure 21:
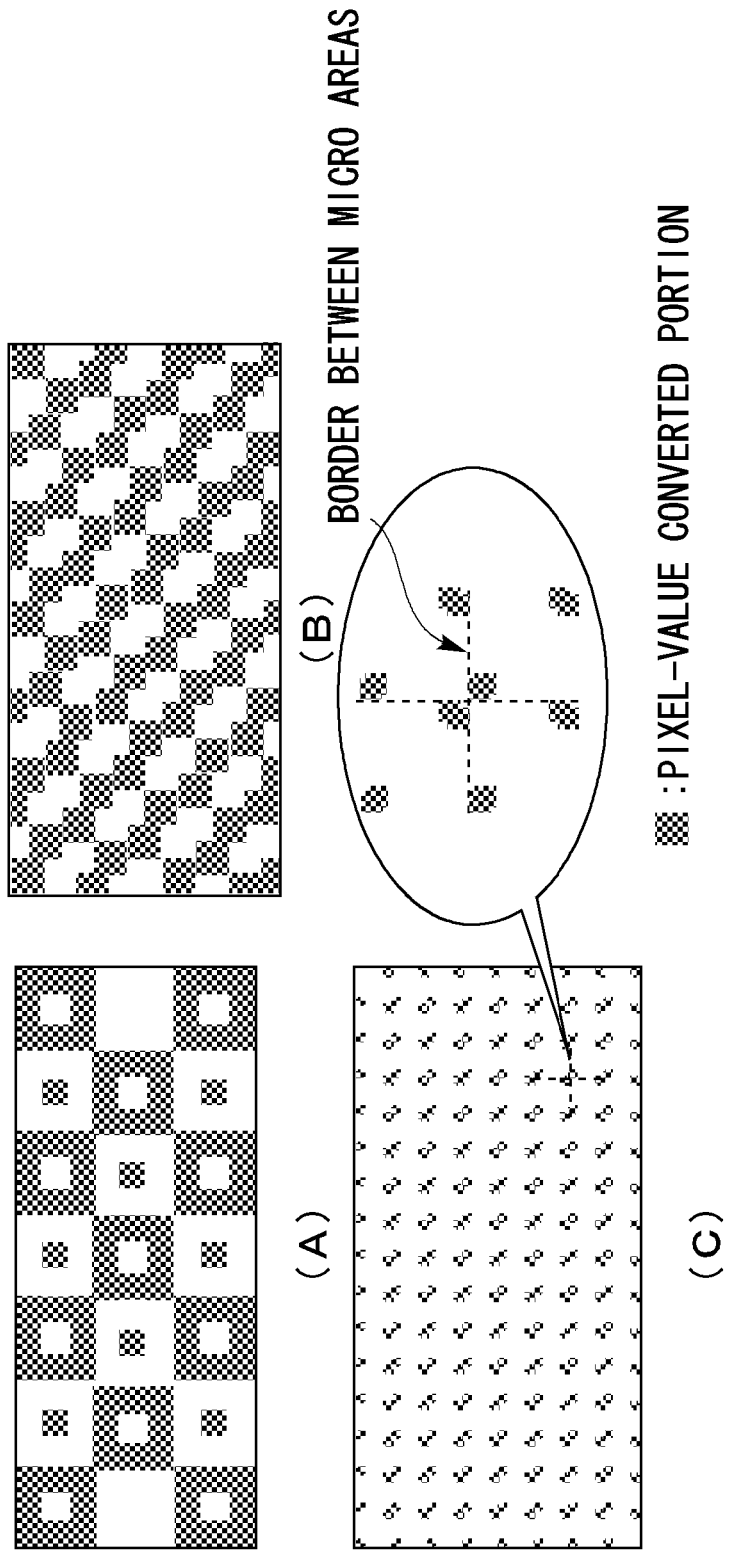
FIG. 21(A)-(C) are diagrams showing an example (part 2) of the pixel value converting process in the pixel value converting unit.

FIG. 21 is a diagram showing an example (part 2) of the pixel value converting process by the pixel value converting unit. Moreover, a variety of shapes as illustrated in (A) through (C) of FIG. 21 can be applied to the area 42 in which to convert the pixel values. The conversion of the pixel values is a process aiming at detecting the border position between the micro areas with the high accuracy, and hence it is considered that, e.g., as in (A) of FIG. 21, only the border portions are pixel-value-converted. Further, as in (B) of FIG. 21, the borders between the conversion and the non-conversion appear at much minuter intervals by converting the pixel values while shifting little by little with respect to the micro areas, whereby the positions of the pixels of the encrypted image 44 can be detected in much greater detail in the decrypting process. Moreover, as in (C) of FIG. 21, only portions, in which the borders between the micro areas, are pixel-value-converted, thereby enabling deterioration of an image quality to be restrained to the minimum when reading and decrypting the images printed on a sheet of paper etc with the scanner and the camera.

Herein, such a postscript is added that if the shape of the micro area is not the square having a uniform size and if the micro areas are triangular ((A) of FIG. 17) of if the micro areas having different sizes and different shapes coexist (B) of FIG. 17), the pixel values are required to be converted by methods corresponding to the shapes without being limited to the conversion examples given above.

As described above, the present invention takes not the scheme that the regular patterns representing the encrypted positions are generated in the way of being overwritten on the inputted image as in Patent document 1 but the scheme that the regular patterns are generated by converting the pixel values of the inputted image. Accordingly, it does not happen that the image information of the edge portions of the encrypted image are sacrificed as by the prior arts, and the encryption can be done at the high efficiency in the form of making the position detecting information coexist with the original image information.

Note that if the pattern forming portions contain some pieces of image information, the regularity thereof is lost more or less, however, as will be mentioned about he process of the decrypting unit 14 that will be described later on, the encrypted positions can be detected by making use of statistical characteristics of the whole encrypted image.

The discussion gets back to the illustration in FIG. 12. The marker adding unit 34 adds positioning markers to, e.g., three corners other than the right lower corner among the four corners of the converted image 92 undergoing the converting process by the pixel value converting unit 33, thereby generating the encrypted image 44.

The marker adding unit 34 allocates the positioning markers for specifying the position of the encryption area 42 to the three corners excluding the right lower corner among the four corners of the converted image 92.

FIG. 22 is a diagram illustrating examples of the positioning markers used for the encryption process. The positioning marker used in the first mode takes, it should be assumed, a circled cross as illustrated in (A) of FIG. 22. The shape of the positioning marker may be in a broader sense formed by the circle or a polygon of a solid line and a plurality of lines intersecting the periphery thereof. This is exemplified such as a shape of [intra-square cross] which resembles kanji character [田] used as the positioning marker in (B) of FIG. 22, a circled Y consisting of three lines extending radially toward the periphery from the center as in the case of the positioning marker in (C), and a circled centrally-voided cross (lines disconnected at the center) as in the case of the positioning marker in (D).

Moreover, a color combination of the positioning marker may be such that most simply the background is white, while the foreground is black, however, it does not cause any inconvenience to properly change the color combination corresponding to a color (pixel values) distribution of the converted image 92 without being limited to the color combination given above. Further, a thinkable method is not that the determined colors are designated for the background and the foreground but that the positioning marker is formed by inverting the pixels values of the foreground while the background color is set to an as-is color of the digital image 41. With this contrivance, the image is encrypted while retaining the input image information of the positioning marker.

Figure 23:
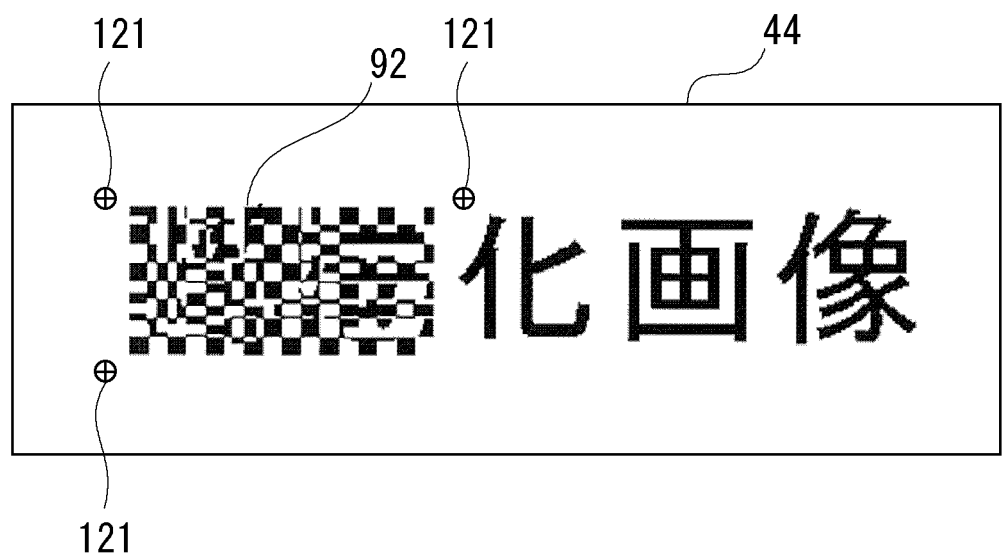
FIG. 23 is a diagram showing an example of the encrypted image.

FIG. 23 is a diagram illustrating an example of the encrypted image. By the processes of the encrypting unit 11A, finally the encrypted image 44 as illustrated in FIG. 23 is generated. The encrypted image 44 contains the converted image 92 and a positioning marker 121.

Moreover, in the encrypting method according to the first mode, when the image converting unit 32 adopts the [micro area rearranging process (scramble process)], the encryption process can be applied to a gray-scale image and a color image as well as to the binary image.

Figure 24:
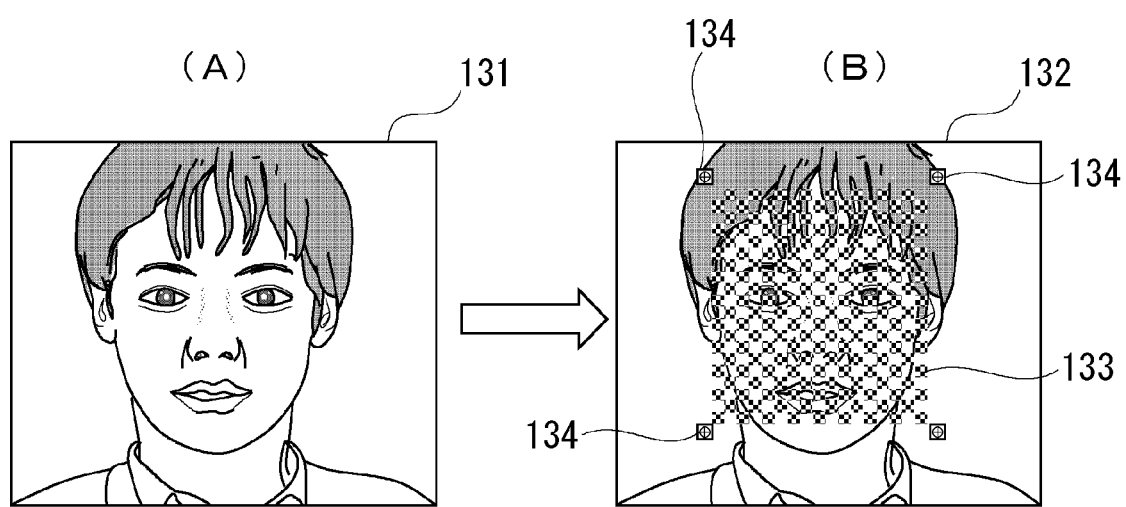
FIG. 24(A)-(B) are diagrams of an example of encrypting a gray-scale image.

FIG. 24 shows an example of how the gray-scale image is encrypted. In FIG. 24, a gray-scale image 131 illustrated in (A) is subjected to the process by the encrypting unit 11A, thereby generating an encrypted image 132 containing a converted image 133 and a positioning marker 134 as illustrated in (B).

Next, the decrypting unit 14A will be described.

Figure 25:
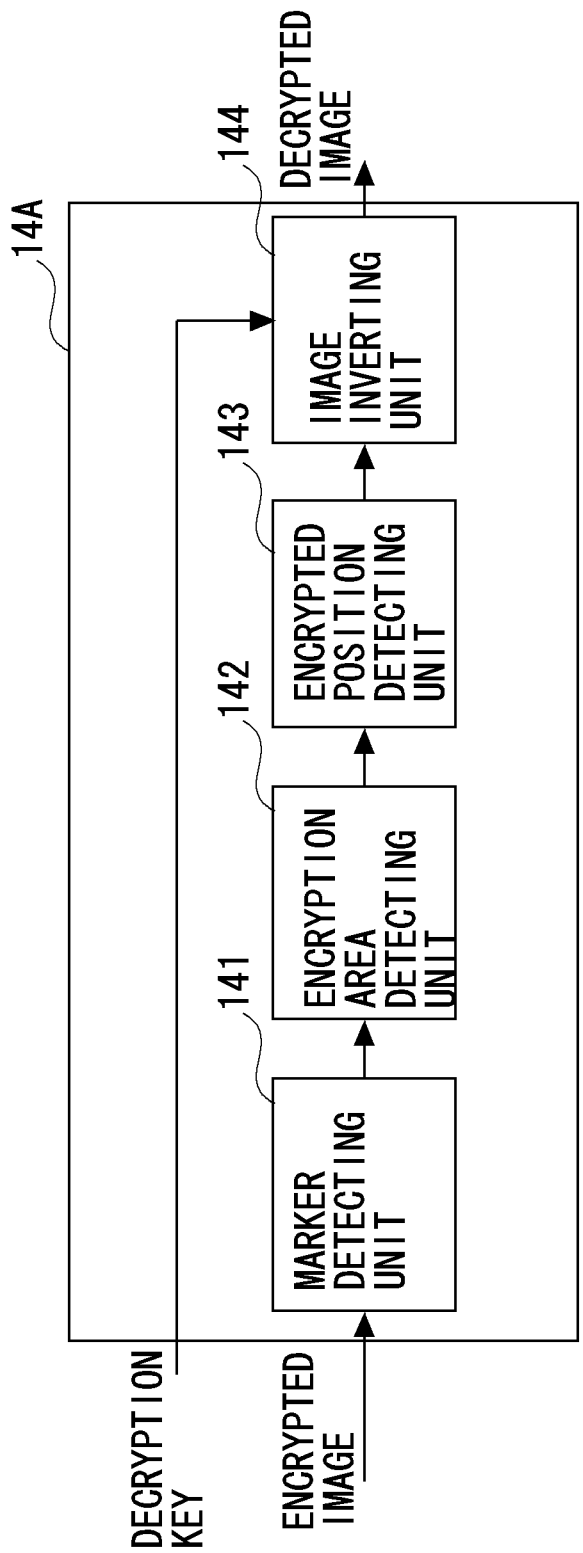
FIG. 25 is a diagram showing an outline of a decrypting process in the first mode.

FIG. 25 is a diagram showing an outline of the decrypting process in the first mode. In FIG. 25, the decrypting unit 14A includes a marker detecting unit 141, an encryption area detecting unit 142, an encrypted position detecting unit 143 and an image inverting unit 144.

The marker detecting unit 141 detects, from the encrypted image, a position of the positioning marker added by the marker adding unit 34 in a way that uses a general image recognition technology. An applicable method as the detecting method involves using pattern matching and analyzing connectivity of graphics.

The encryption area detecting unit 142 detects the encrypted image area on the basis of the positional relation between the three positioning markers detected by the marker detecting unit 141.

Figure 26:
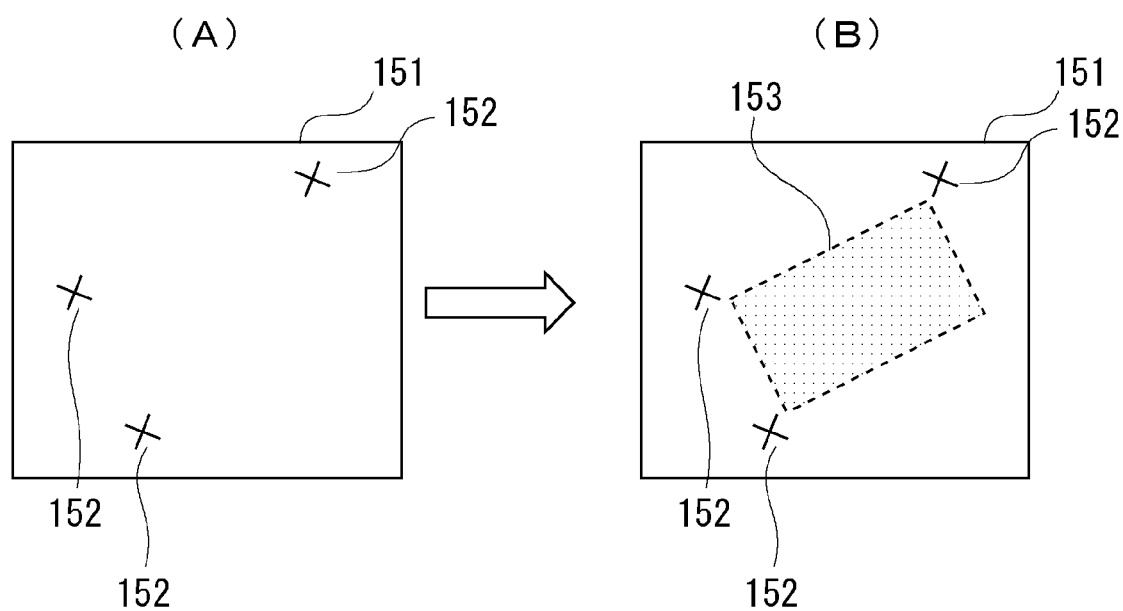
FIG. 26(A)-(B) are diagrams showing a process of detecting the encryption area from the positioning marker.

FIG. 26 is a diagram showing a process of detecting the encryption area from the positioning marker. As shown in (A) of FIG. 26, when the marker detecting unit 141 detects at least three positioning markers 152 from the encrypted image 151, as illustrated in (B), one encryption area 153 can be detected. Namely, the three positioning markers 152 are disposed at the four corners of the rectangular encryption area 153, and hence a graphic form obtained by connecting these three points (the positions of the positioning markers 152) with lines becomes roughly a right-angled triangle. Then, if the three or more positioning markers 152 are detected, the positional relation between the three positioning markers 152 embraces an area taking a shape that is approximate to the right-angled triangle, and the encryption area 153 takes a rectangular shape in which the three positioning markers 152 correspond to three angular points among the four angular points. Note that if the number of the detected positioning markers 152 is equal to or smaller than "2", the corresponding encryption area 153 can not be specified, and hence the decrypting process is terminated on the assumption that the encrypted image does not exist.

Figure 27:
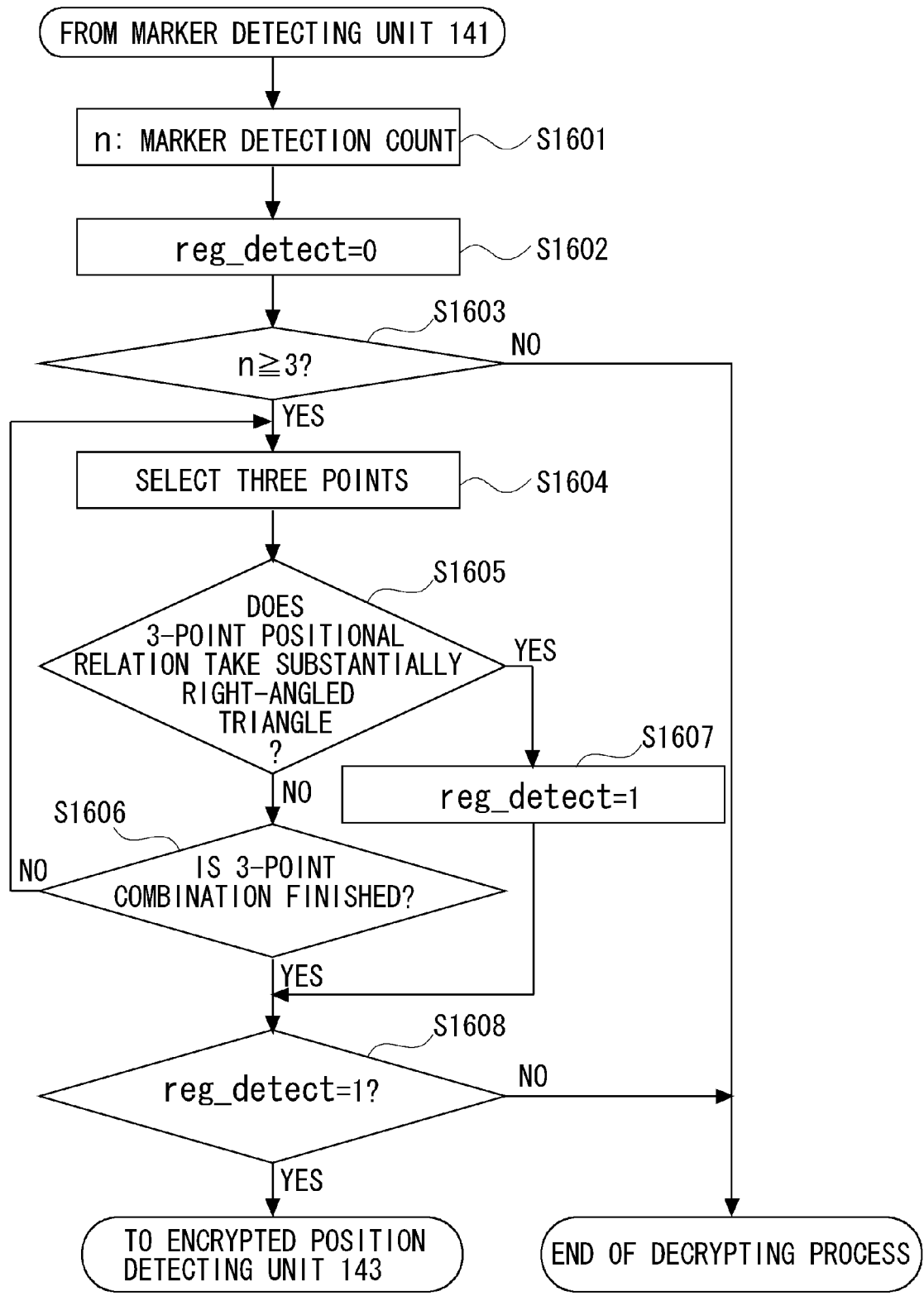
FIG. 27 is a flowchart showing a flow of an encryption area detecting process.

FIG. 27 is a flowchart showing a flow of the encryption area detecting process. The encryption area detecting process executed by the encryption area detecting unit 142 starts with step S1601 in which the number of the positioning markers 152 detected by the marker detecting unit 141 is substituted into a variable n, and in step S1602, "0" is substituted into a detection flag "reg_detect" of the encryption area 153.

Then, in step S1603, it is determined whether or not the variable n, into which the number of the positioning markers 152 is substituted, is equal to or larger than "3", and, if the variable n is not equal to or larger than "3", i.e., if the variable n is not equal to or smaller than "2" (step S1603: No), the decrypting process including the present encryption area detecting process is terminated.

While on the other hand, if the variable n is equal to or larger than "3" (step S1603: Yes), in step S1604, the three positioning markers 152 among the positioning markers 152 detected by the marker detecting unit 141 are selected, and, in step S1605, it is determined whether or not the positional relation between the thus-selected three positioning markers 152 takes substantially the right-angled triangle.

If the positional relation between the selected three positioning markers 152 does not take substantially the right-angled triangle (step S1605: No), in step S1606, it is determined whether or not a 3-point combination of the positioning markers 152 detected by the marker detecting unit 141 is completely finished, then, if not finished (step S1606: No), returning to step S1604, another set of three points is selected, and, when finished (step S1606: Yes), the operation proceeds to step S1608.

Whereas if the positional relation between the selected three positioning markers 152 takes substantially the right-angled triangle (step S1605: Yes), in step S1607, "1" is substituted into the detection flag "reg_detect".

Then, in step S1608, it is determined whether or not "1" is substituted into the detection flag "reg_detect", i.e., it is determined whether or not the three positioning markers 152 of which the 3-point positional relation takes the right-angled triangle can be detected, and the operation proceeds to a process by the encrypted position detecting unit 143 if "1" is substituted into the flag "reg_detect" (step S1608: Yes) and to the decrypting process including the present encryption area detecting process is finished whereas if "1" is not substituted into the flag "reg_detect" (step S1608: No).

The discussion gets back to the illustration in FIG. 25. The encrypted position detecting unit 143 detects minute positions of the respective pixels within the encryption area 153 by the frequency analysis and pattern matching in a way that makes use of a point that the edge portions of the encryption area 153 detected by the encryption area detecting unit 142 have a regular pixel distribution in order to accurately decrypt the encrypted image 151. This detection involves utilizing such a characteristic that the whole of the encrypted image 151 has the periodic pattern owing to the pixel value converting (inverting) process of the pixel value converting unit 33.

One thinkable detection method is a method of obtaining a pattern cycle (width) in horizontal and vertical directions of the image by use of a frequency analyzing method such as Fast Fourier Transform (FFT) and thereafter detecting the border positions (offset) by template matching etc.

Further, the border positions can be detected by Hough transform in a way that utilizes such a characteristic that the border portion becomes rectilinear when applying an edge detection filter (Laplacian filter etc) to the encrypted image.

Figure 28:
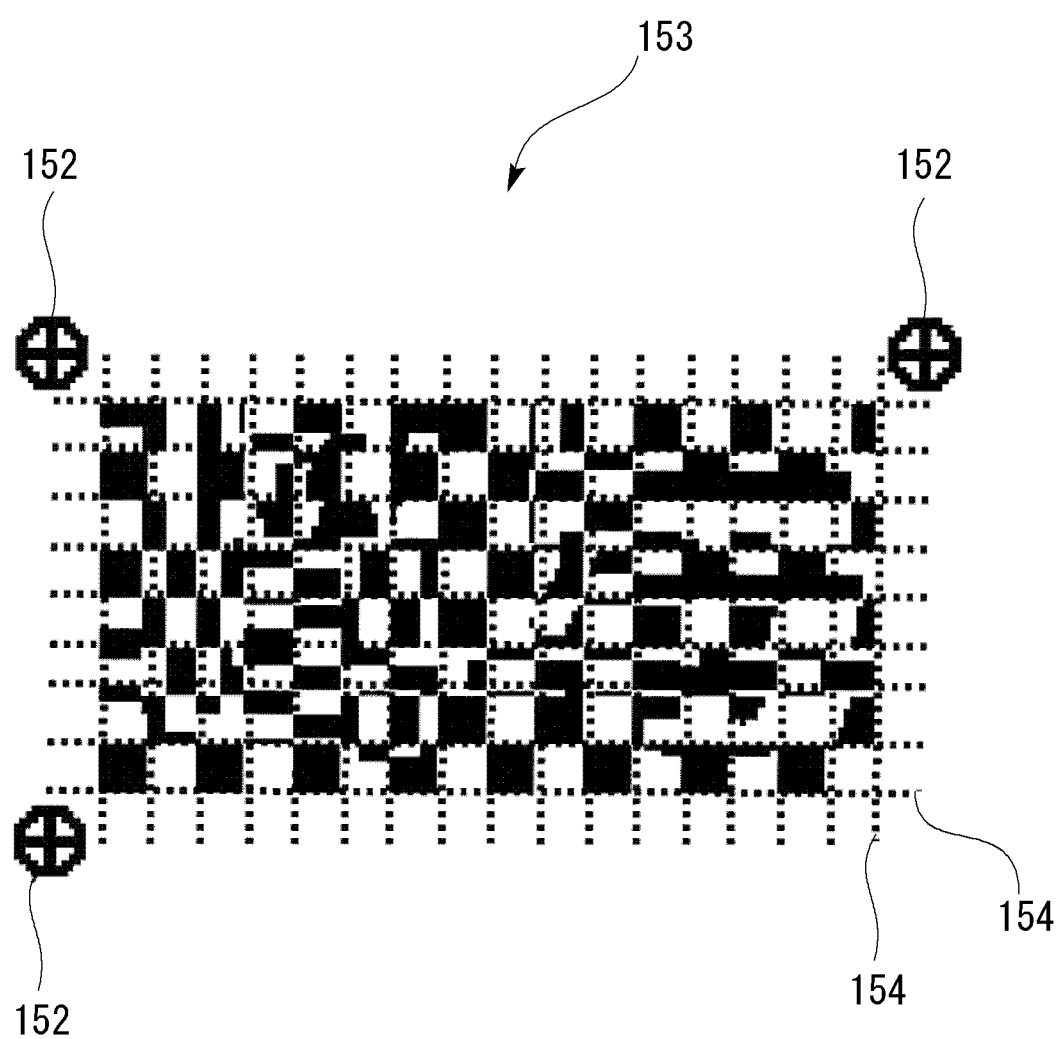
FIG. 28 is a diagram showing an example in which an encrypted position is detected.

FIG. 28 is a diagram showing an example of how the encrypted positions are detected. If the encrypted digital image 41 is complicated, a possibility is that a portion with a remarkably declined cyclicality of the encrypted image 44 might appear. In this case, an effective method is a method of detecting the encrypted positions in a way that limits the image area used for calculating the pattern cycle and the border positions to the portions exhibiting comparatively strong cyclicality.

The discussion gets back to the illustration in FIG. 25. The image inverting unit 144 executes, about the encrypted image 44, the inverting process of the converting process of the image inverting unit 32 on the basis of a method corresponding to a decryption key by use of the encrypted position information detected by the encrypted position detecting unit 143 and the decryption key inputted by a user, thereby generating a decrypted image. A procedure of the decrypting process is realized by the procedure reversed to the encrypting process, and hence its description is omitted. What has been discussed so far is the description of the first mode to which the present invention is applied.

Next, a second mode to which the present invention is applied will be described.

Figure 29:
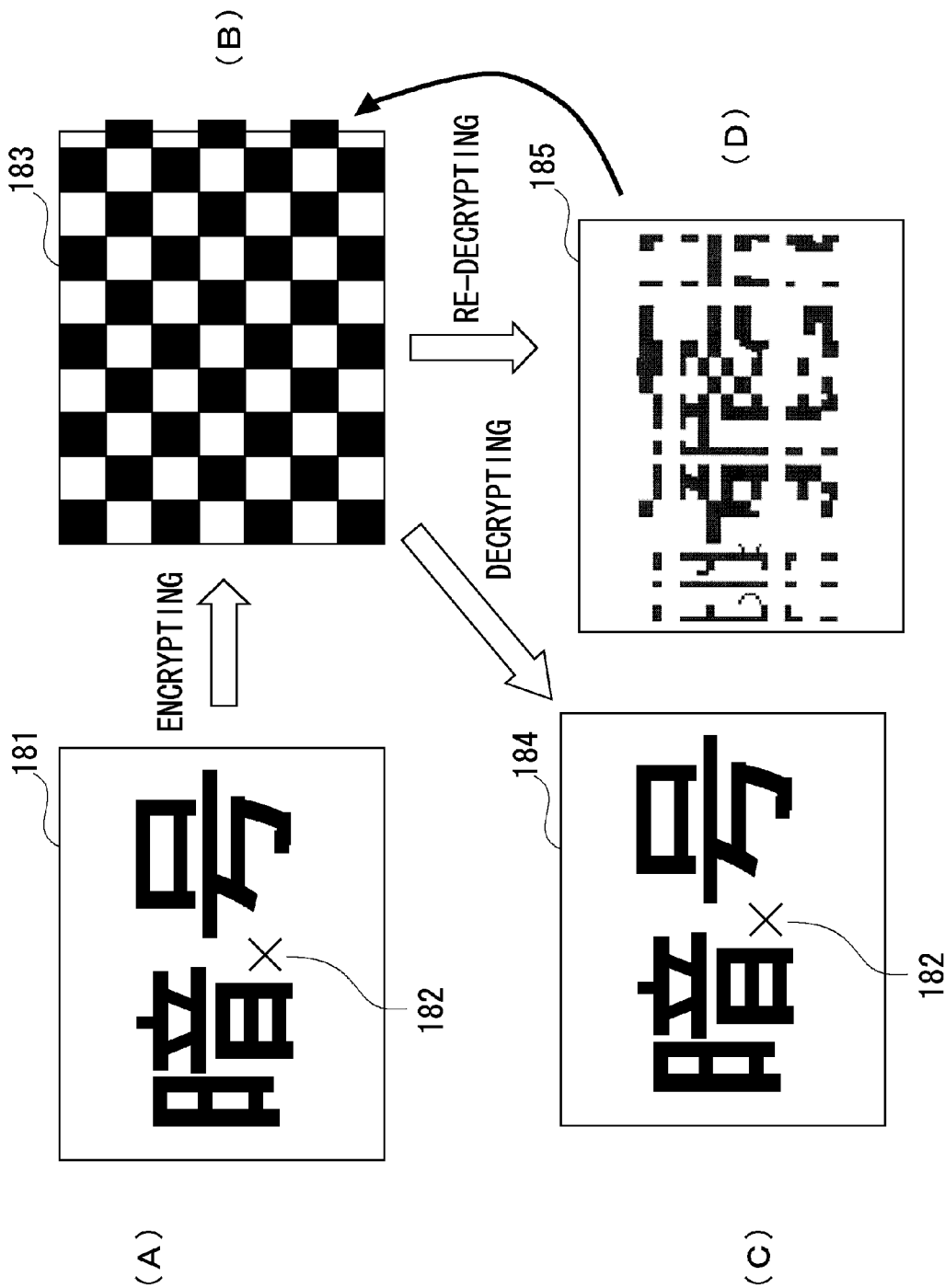
FIG. 29(A)-(D) are diagrams illustrating a whole image in a second mode.

FIG. 29 is a diagram showing a whole image according to the second mode. The second mode is that before the encrypting process, a specified check mark 182 for verifying validity of decrypting the encrypted image 183 ((A) in FIG. 29) is attached to an arbitrary position of an area 181 to be encrypted, then the encryption is conducted ((B) in FIG. 29), the decryption is considered to be performed correctly if the check mark 182 attached beforehand is detected from the decrypted image 184 after decrypting the encrypted image 183, and the decrypting process is terminated ((C) in FIG. 29). Whereas if the check mark 182 is not detected ((D) in FIG. 29), the encrypted position is corrected, and the decrypting process is repeated till the check mark 182 is detected or till a designated standard is satisfied.

Figure 30:
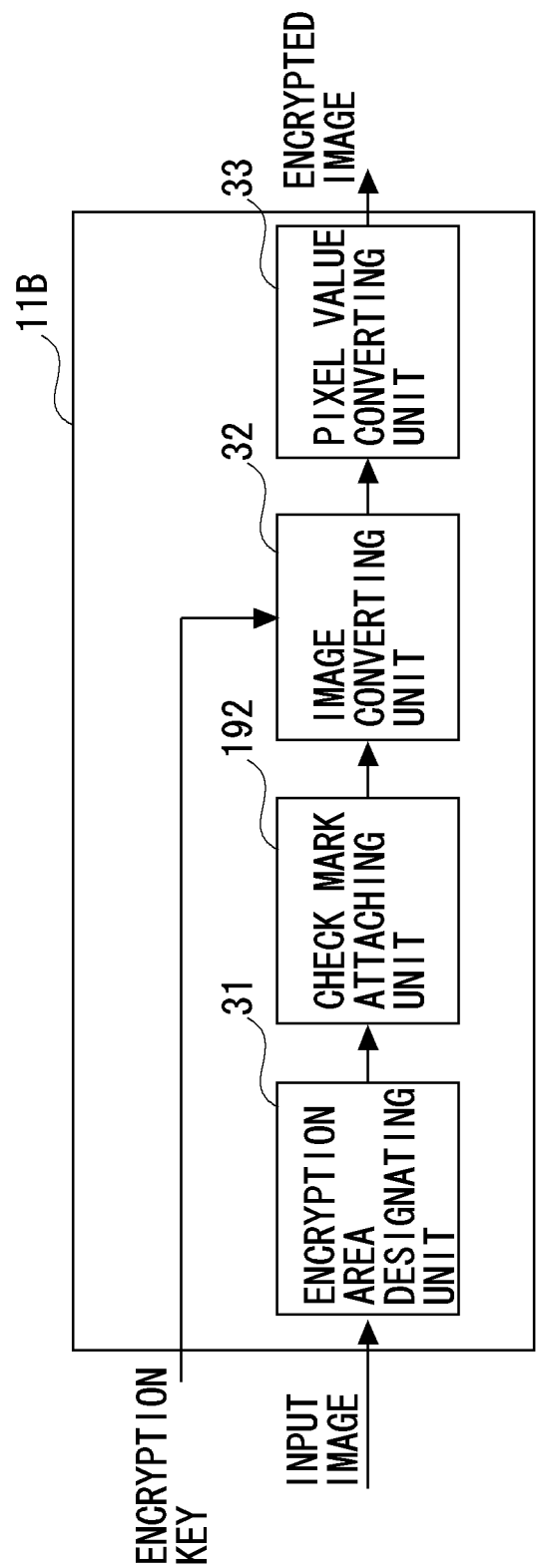
FIG. 30 is a diagram showing and outline of the encrypting process in the second mode.

FIG. 30 is a diagram illustrating an outline of the encrypting process in the second mode. In FIG. 30, the encrypting unit 11B includes the encryption area determining unit 31, a check mark attaching unit 192, the image converting unit 32 and the pixel value converting unit 33.

In the same way as in the first mode, the encryption area designating unit 31 selects the to-be-encryption area from the input image containing a want-to-encrypt area.

Then, the check mark attaching unit 192 attaches the specified check mark 182 for verifying the validity of decrypting the encrypted image 183 to the arbitrary position of the area 181 to the encrypted. The check mark 182 is, it is desirable, attached to an area having, if possible, fewer image information and a flat pixel distribution.

After attaching the check mark 182 to the designated position, in the same way as in the first mode, the image converting unit 32 inputs the area 181 to be encrypted and the encryption key, an image of the area 181 to be encrypted is visually converted by the converting method corresponding to the encryption key, and the pixel value converting unit 33 converts at the fixed intervals the pixels within the processed image converted by the image converting unit 32, thus making the converted image take substantially the grating-shaped stripped pattern.

Figure 31:
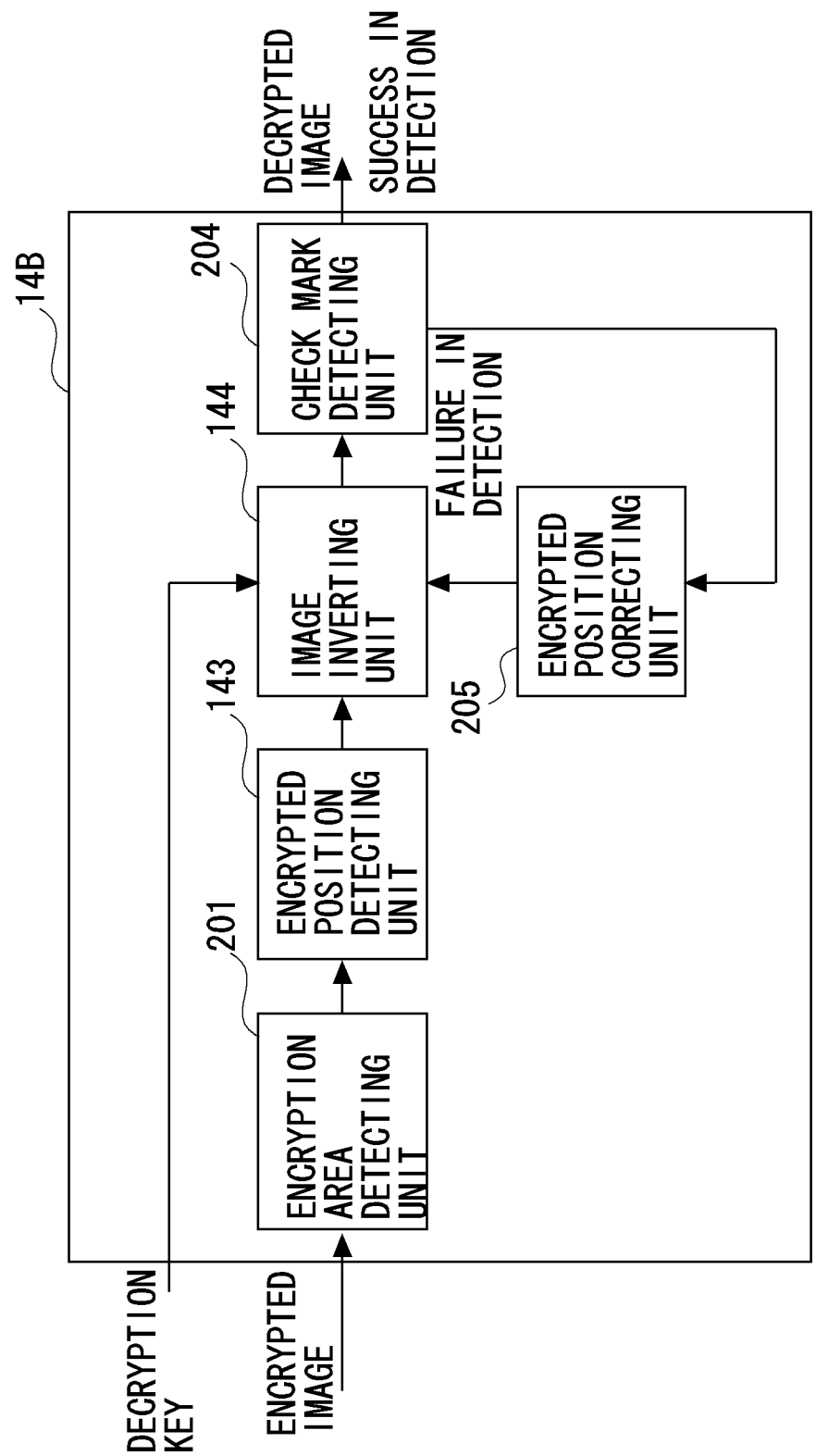
FIG. 31 is a diagram showing an outline of the decrypting process in the second mode.

FIG. 31 is a diagram showing an outline of the decrypting process in the second mode. In FIG. 31, the decrypting unit 14B includes an encryption area detecting unit 201, an encrypted position detecting unit 143, an image inverting unit 144, a check mark detecting unit 204 and an encrypted position correcting unit 205.

To start with, the encryption area detecting unit 201 detects a rough area of the encrypted image 183. Through the encrypting process by the encrypting unit 11B, a pixel distribution of the encrypted image 183 takes roughly a checkered pattern, and therefore, if the frequency analysis such as FFT is conducted about the horizontal and vertical directions thereof, power of a frequency corresponding to a stripe cycle becomes conspicuously strong.

Figure 32:
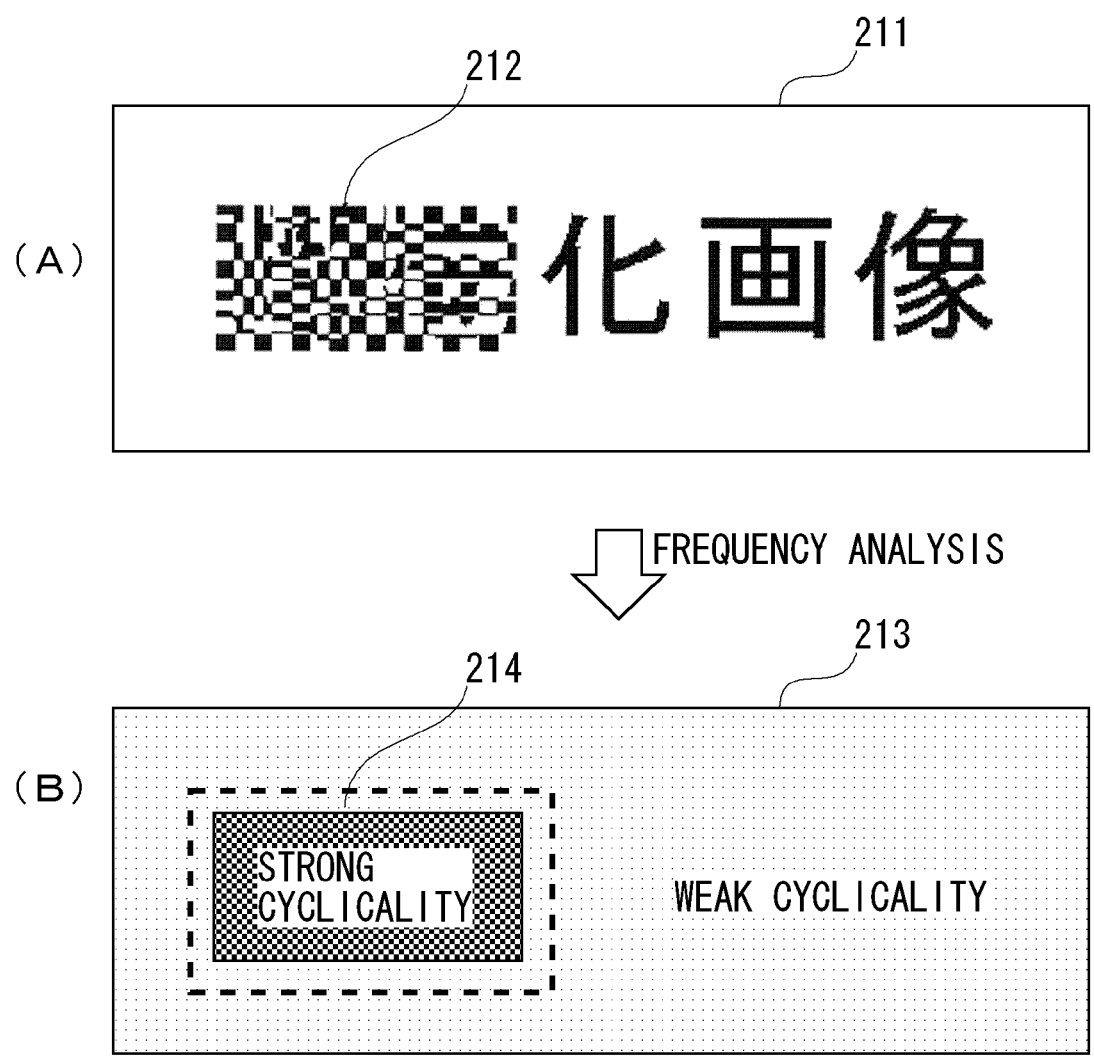
FIG. 32(A)-(B) are explanatory diagrams of an encryption area detecting method.

FIG. 32 is an explanatory diagram of a method of detecting the encryption area. As illustrated in (A) of FIG. 32, when performing the frequency analysis about an encrypted image 211, as shown in (B), a power intensive area of a certain frequency is expressed as a [strong cyclicality] 214 (a frequency of an integral multiple of the former frequency). The cyclicality of the pixel distribution within the encryption area tends to be strong, and it is therefore feasible to detect a rough encryption area and a stripped pattern cycle.

The discussion gets back to the illustration in FIG. 31. The encrypted position detecting unit 143, after the encryption area detecting unit 201 has specified a rough encryption area, detects the encryption area more precisely, and simultaneously the minute positions of the respective pixels in the encryption area. Such a method can be considered as one example of the positional detection that the border position (offset) of the pixel-value conversion is obtained from the stripped pattern cycle acquired by the encryption area detecting unit 201 and from an absolute pixel value difference distribution, and the areas exhibiting a comparatively large absolute pixel value difference are further narrowed down therefrom. Moreover, in the same way as by the encrypted position detecting unit 143 in the first mode, the detection of the encrypted position can involve using the Hough transform.

Figure 33:
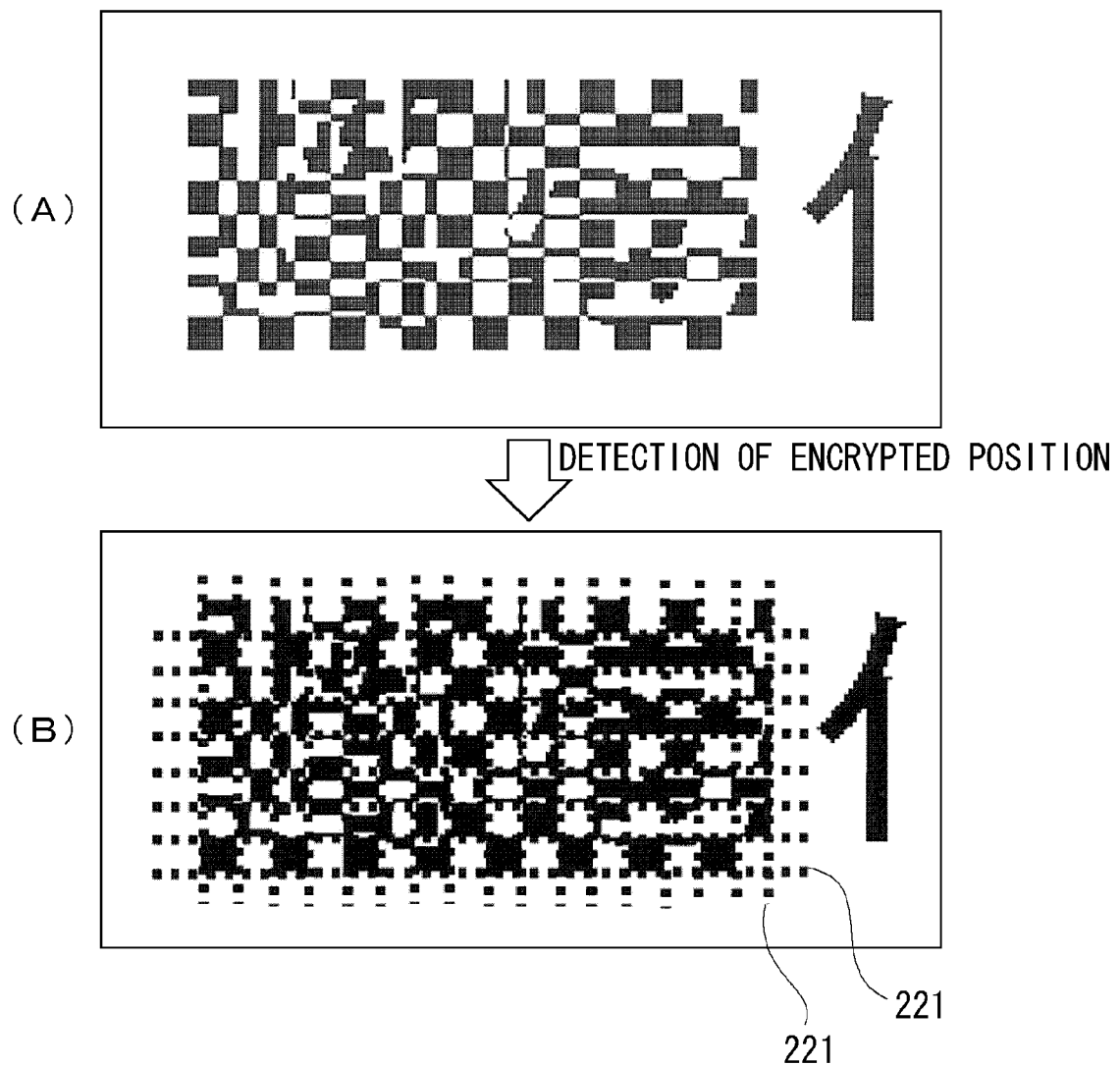
FIG. 33(A)-(B) are explanatory diagrams of a method of detecting an encrypted position (in a horizontal direction).

FIG. 33 is an explanatory diagram of the method of detecting the encrypted position (in the horizontal direction). As stated above, when the encryption area detecting process described above is conducted respectively in the horizontal direction and in the vertical direction, as illustrated in FIG. 33, an encrypted position 221 is detected.

The discussion gets back to the illustration in FIG. 31. The image inverting unit 144 generates a decrypted image by executing the same method as in the first mode in a way that employs the information on the encrypted position and a decryption key.

The check mark detecting unit 204 tries to detect the check mark from the decrypted image decrypted by the image inverting unit 144. The detecting method is the same as the marker detecting process in the first mode, and hence its explanation is omitted. Then, when the check mark is detected, the decrypted image is output, and the process is terminated. When the check mark is not detected, the encrypted position correcting unit 205 corrects the encrypted position, and, till the check mark is detected or till a designated standard is satisfied, the decrypting process (image inverting process) is redone.

Figure 34:
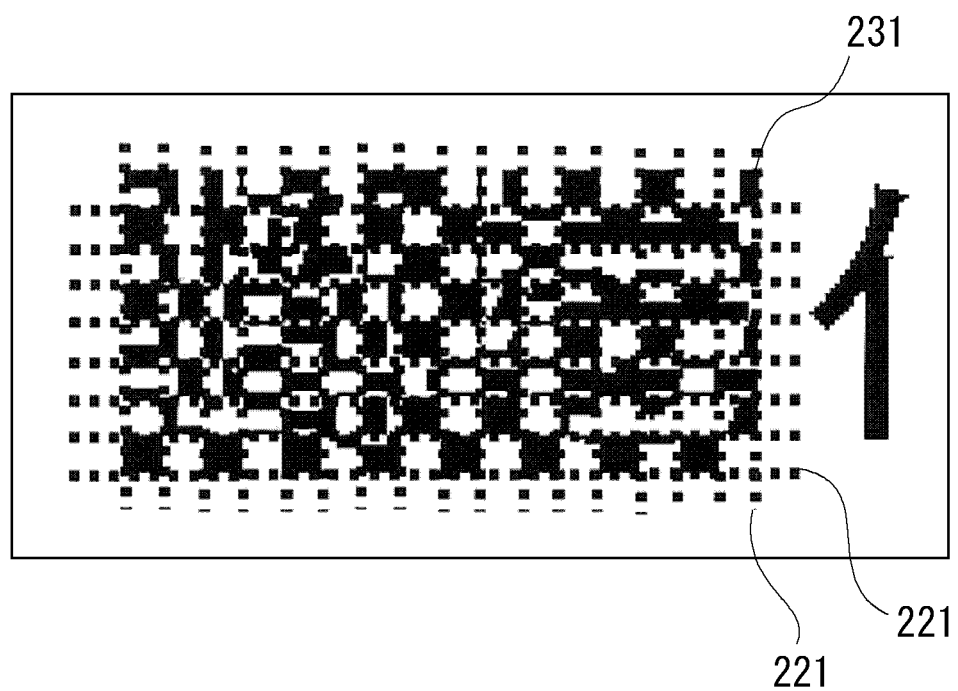
FIG. 34 is a diagram showing an example of mis-detecting the encrypted position.

FIG. 34 is a diagram showing an example of how the encrypted position is mis-detected. As illustrated in FIG. 34, there is considered a case in which an edge of the encrypted image is overlooked (a fail-in-detection line 231). Such being the case, when failing to detect the check mark 221, lines representing the encrypted position are added to or deleted from the left right edge and the upper lower edge, and the image inverting process is executed, thus examining in various ways whether the check mark 221 is detected or not. If the check mark 221 can not be detected by adding or deleting the lines in whatever manner, the process is ended without outputting the decrypted image. What has been discussed so far is the description about the second mode to which the present invention is applied.

Next, a third mode to which the present invention is applied will be described. The third mode of the present invention entails encrypting the image and decrypting the encrypted image by use of both of the positioning marker for specifying the encryption area that is exemplified in the first mode and the check mark for determining the validity of the decrypted image in the second mode. An image decryption error caused when the valid decryption key is inputted can be reduced by use of the two types of markers such as the position marker for the positional detection and the check mark for checking the decrypted image.

Figure 35:
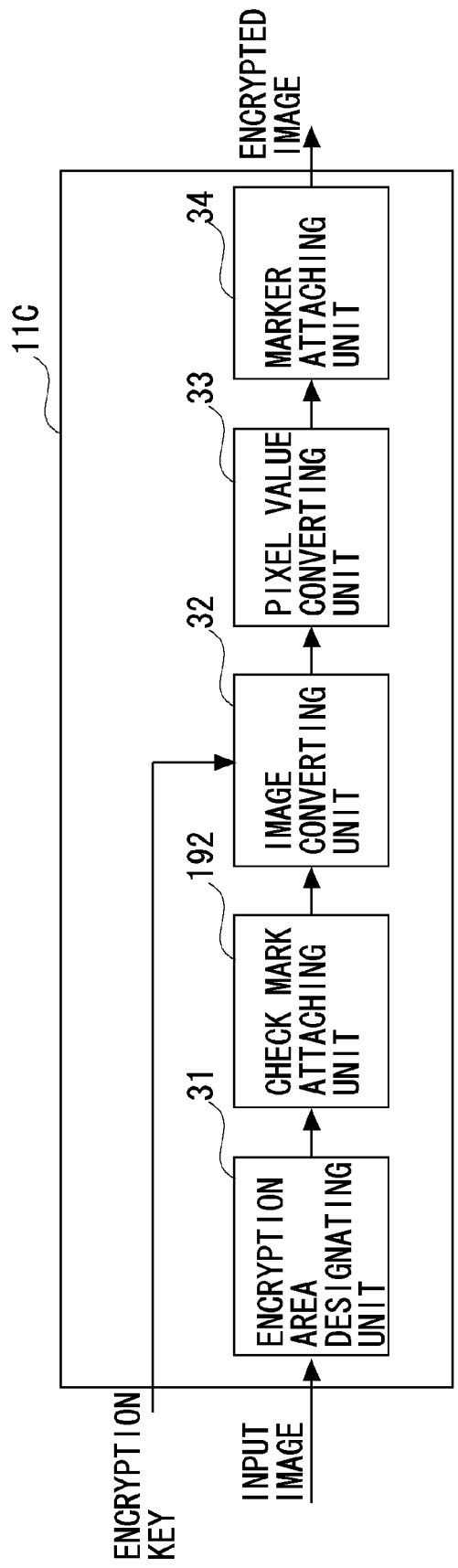
FIG. 35 is a diagram showing an outline of the encrypting process in a third mode.

FIG. 35 is a diagram showing an outline of the encrypting process in the third mode. In FIG. 35, the encrypting unit 11C includes the encryption area determining unit 31, a check mark attaching unit 192, the image converting unit 32, the pixel value converting unit 33 and the marker attaching unit 34.

To begin with, the encryption area determining unit 31 selects the image area to be encrypted, and the check mark attaching unit 192 attaches the check mark for verifying the decryption by the same method as in the second mode. After attaching the check mark, the image converting unit 32 and the pixel value converting unit 33 encrypt the image by executing the image process by the same method as in the first and second modes, and the marker attaching unit 34 attaches the positioning marker for detecting the encryption area by the same method as in the first mode. The contents of the respective processes are the same as those in the first or second mode, and hence their explanations are omitted.

Figure 36:
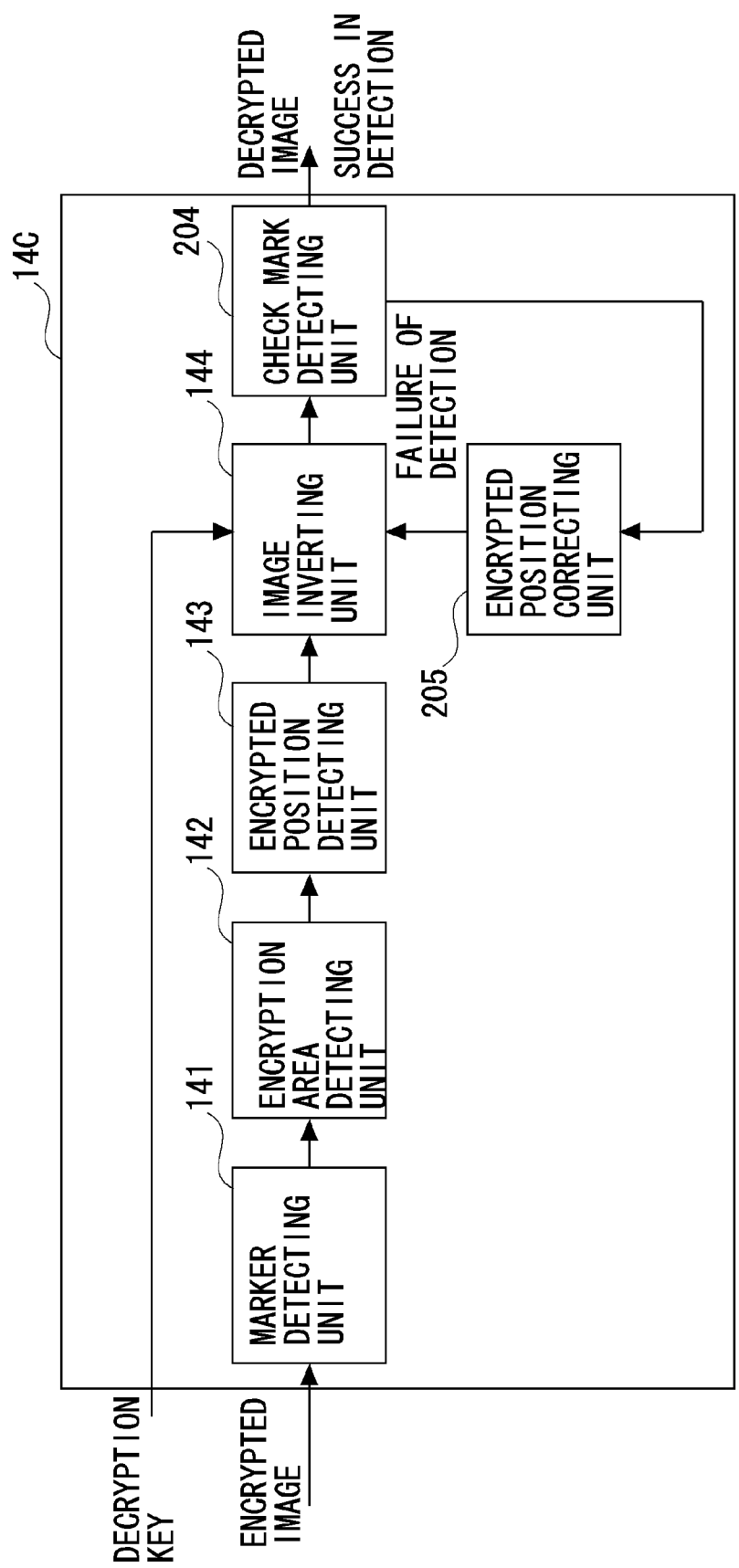
FIG. 36 is a diagram showing an outline of the decrypting process in the third mode.

FIG. 36 is a diagram showing an outline of the decrypting process in the third mode. In FIG. 36, the decrypting unit 14C includes the marker detecting unit 141, the encryption area detecting unit 142, the encrypted position detecting unit 143, the image inverting unit 144, the check mark detecting unit 204 and the encrypted position correcting unit 205.

At first, the marker detecting unit 141 detects the positioning marker by the same method as in the first mode, and subsequently the encryption area detecting unit 142 detects the encryption area by the same method as in the first mode. Moreover, the encrypted position detecting unit 143 detects the minute positions of the respective pixels in the encryption area by the same method as in the first mode. Furthermore, the respective processing procedures executed by the check mark detecting unit 204 and the encrypted position correcting unit 205 are the same as those in the second mode, and hence their explanations are omitted. What has been discussed so far is the description about the third mode to which the present invention is applied.

What is claimed is:

1. An electronic document processing system comprising:
    a digital image generating unit generating a digital image defined as an aggregation of pixels from a predetermined range of an original electronic document including text information, font information, graphs, images or layout information;
    an image encrypting unit generating an encrypted image by converting at least a partial area of the digital image generated by said digital image generating unit by use of a key information;
    a data encrypting unit extracting data contained in the predetermined range of the original electronic document and encrypting the extracted data by use of the key information;
    an encrypted data storing unit storing the encrypted data; and
    an encrypted electronic document generating unit generating an encrypted electronic document by replacing the data contained in the predetermined range in the original electronic document with the encrypted image.

2. The electronic document processing system according to claim 1, further comprising:
    an input accepting unit accepting an input of an image encrypting target area becoming an image encrypting target that is designated in an image into which the original electronic document is rendered and output; and
    an imaging target range specifying unit specifying, as the predetermined range becoming the imaging target of said digital image generating unit, a range including all of elements that at least some portions of a rendered image of the elements are embraced by the image encrypting target area in the render-output image, in the respective elements of the data within the original electronic document, on the basis of the image encrypting target area accepted by said input accepting unit.

3. The electronic document processing system according to claim 1, wherein said encrypted data storing unit stores the encrypted data in a way that adds the encrypted data to a header area, a footer area, a comment area or an extended area of the original electronic document.

4. The electronic document processing system according to claim 1, wherein said encrypted data storing unit adds the encrypted data by way of steganography, a digital watermark or meta-information of the image to the encrypted image.

5. The electronic document processing system according to claim 1, wherein said image encrypting unit converts an image of the encrypting target area into a processing image by use of the key information, and generates the encrypted image containing a converted image having regularity used for specifying an encrypting position on the occasion of decryption by regularly converting pixel values of the processing image.

6. An electronic document processing system comprising:
   an encrypted data acquiring unit acquiring encrypted data generated by encrypting data by use of a key information, the data being a target of a digital image contained in a predetermined range of an original electronic document, the data being replaced with an encrypted image generated by converting at least a part of the digital image generated from the predetermined range of the original electronic document including text information, font information, graphs, images or layout information;
   a data decrypting unit decrypting, by use of the key information, the encrypted data acquired by said encrypted data acquiring unit to generate decrypted data; and
   a decrypted electronic document generating unit generating decrypted electronic document by replacing the encrypted image included in the original electronic document with the decrypted data.

7. The electronic document processing system according to claim 6, further comprising:
   an encrypted image acquiring unit acquiring the encrypted image from the original electronic document;
   an image decrypting unit generating a decrypted digital image by decrypting the encrypted image acquired by said encrypted image acquiring unit by use of the key information; and
   a decrypted digital image output unit outputting a digital image decrypted by said image decrypting unit in place of the encrypted image when the original electronic document including the encrypted image is output for a browsing purpose.

8. The electronic document processing system according to claim 7, wherein said image decrypting unit detects an encrypting position where pixel values of the encrypted image are regularly converted and decrypts the encrypted image into a digital image on the basis of the encrypting position and the key information.

9. The electronic document processing system according to claim 6, wherein said encrypted data acquiring unit acquires the encrypted data from a header area, a footer area, a comment area or an extended area of the original electronic document.

10. The electronic document processing system according to claim 6, wherein said encrypted data acquiring unit acquires the encrypted data by way of steganography, a digital watermark or meta-information embedded in the image to the encrypted image.

11. A non-transitory computer-readable medium recorded with an electronic document processing program which when executed by a processor causes a computer to function as:
   a digital image generating unit generating a digital image defined as an aggregation of pixels from a predetermined range of an original electronic document including text information, font information, graphs, images or layout information;
   an image encrypting unit generating an encrypted image by converting at least a partial area of the digital image generated by said digital image generating unit by use of a key information;
   a data encrypting unit extracting data contained in the predetermined range of the original electronic document and encrypting the extracted data by use of the key information;
   an encrypted data storing unit storing the encrypted data; and
   an encrypted electronic document generating unit generating an encrypted electronic document by replacing the data contained in the predetermined range in the original electronic document with the encrypted image.

12. A non-transitory computer-readable medium having thereon an electronic document processing program which when executed by a processor causes a computer to function as:
   an encrypted data acquiring unit acquiring encrypted data generated by encrypting data by use of a key information, the data contained in the a predetermined range of an original electronic document and replaced with an encrypted image generated by converting at least a part of a digital image generated from the predetermined range of the original electronic document including text information, font information, graphs, images or layout information;
   a data decrypting unit generating decrypted data which is a target of the digital image generation by decrypting, by use of the key information, the encrypted data acquired by said encrypted data acquiring unit to generate decrypted data; and
   a decrypted electronic document generating unit generating decrypted electronic document by replacing the encrypted image included in the original electronic document with the decrypted data.

\* \* \* \* \*